US012782382B2

(12) United States Patent
Masunishi et al.

(10) Patent No.: US 12,782,382 B2
(45) Date of Patent: Nov. 3, 2026

(54) SENSOR AND ELECTRONIC DEVICE

(71) Applicant: KABUSHIKI KAISHA TOSHIBA, Tokyo (JP)

(72) Inventors: Kei Masunishi, Kawasaki Kanagawa (JP); Etsuji Ogawa, Kawasaki Kanagawa (JP); Yasushi Tomizawa, Tokyo (JP); Fumito Miyazaki, Yokohama Kanagawa (JP); Daiki Ono, Yokohama Kanagawa (JP); Kengo Uchida, Kawasaki Kanagawa (JP); Jumpei Ogawa, Kawasaki Kanagawa (JP); Fumitaka Ishibashi, Tokyo (JP); Hideaki Murase, Yokohama Kanagawa (JP)

(73) Assignee: KABUSHIKI KAISHA TOSHIBA, Kawasaki Kanagawa (JP)

( * ) Notice: Subject to any disclaimer, the term of this patent is extended or adjusted under 35 U.S.C. 154(b) by 580 days.

(21) Appl. No.: 18/365,591

(22) Filed: Aug. 4, 2023

(65) Prior Publication Data

US 2024/0310404 A1 Sep. 19, 2024

(30) Foreign Application Priority Data

Mar. 13, 2023 (JP) ................................ 2023-038506

(51) Int. Cl.
*G01P 15/08* (2006.01)

(52) U.S. Cl.
CPC .................................... *G01P 15/08* (2013.01)

(58) Field of Classification Search
CPC ...... G01P 15/08; G01P 15/097; B81B 3/0037; B81B 2201/0235; B81B 2203/04; B81B 2203/051; B81B 2203/056
See application file for complete search history.

(56) References Cited

U.S. PATENT DOCUMENTS 9,689,888 B2 6/2017 Becka
10,859,596 B2 12/2020 Reinke et al.
(Continued)

FOREIGN PATENT DOCUMENTS

JP 2024-41698 A 3/2024

OTHER PUBLICATIONS

Dongsuk D. Shin et al., "Environmentally Robust Differential Resonant Accelerometer in a Wafer-Scale Encapsulation Process," IEEE 30th Int'l Conf. on Micro Electro Mechanical Systems (MEMS), Las Vegas, NV, USA, pp. 17-20 (2017).

*Primary Examiner* — Xin Y Zhong
(74) *Attorney, Agent, or Firm* — Finnegan, Henderson, Farabow, Garret & Dunner, LLP

(57) ABSTRACT

According to one embodiment, a sensor includes a first beam, a first opposing beam, a support portion, a first linking portion, and a first connecting portion. The first beam includes a first portion and a first other portion. A direction from the first portion to the first other portion is along a first direction. A second direction from the first opposing beam to the first beam crosses the first direction. The first opposing beam includes a first opposing portion and a first other opposing portion. The first linking portion is connected to the first other portion and the first other opposing portion. The first connecting portion is connected to the first linking portion. A first connecting portion width along the second direction of the first connecting portion is narrower than a first linking portion width along the second direction of the first linking portion.

14 Claims, 17 Drawing Sheets

(56) References Cited

U.S. PATENT DOCUMENTS

| | | | | |
|---|---|---|---|---|
| 10,866,258 | B2 | 12/2020 | Reinke et al. | |
| 2002/0152812 | A1* | 10/2002 | Featonby | G01P 15/097<br>73/504.12 |
| 2023/0062441 | A1* | 3/2023 | Masunishi | G01P 15/097 |
| 2024/0085181 | A1 | 3/2024 | Masunishi et al. | |

* cited by examiner

SENSOR AND ELECTRONIC DEVICE

CROSS-REFERENCE TO RELATED APPLICATIONS

This application is based upon and claims the benefit of priority from Japanese Patent Application No. 2023-038506, filed on Mar. 13, 2023; the entire contents of which are incorporated herein by reference.

FIELD

Embodiments described herein relate generally to a sensor and an electronic device.

BACKGROUND

For example, there is a sensor using a MEMS structure. It is desired to improve the characteristics of the sensor.

DETAILED DESCRIPTION

Figure 1:
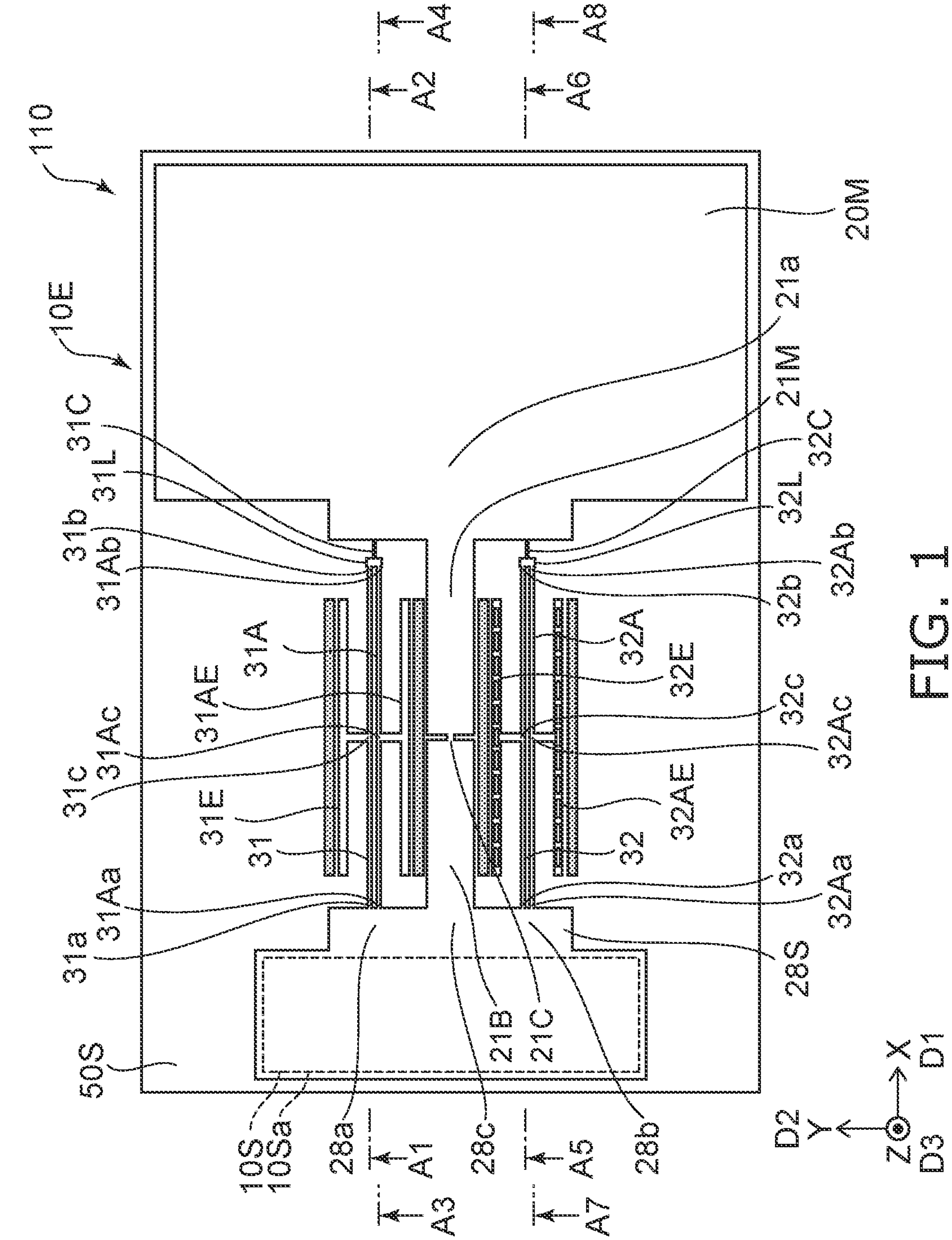
FIG. 1 is a schematic plan view illustrating a sensor according to a first embodiment.

According to one embodiment, a sensor includes an element section. The element section includes a first beam, a first opposing beam, a support portion, a first linking portion, and a first connecting portion. The first beam includes a first portion and a first other portion. A direction from the first portion to the first other portion is along a first direction. A second direction from the first opposing beam to the first beam crosses the first direction. The first opposing beam includes a first opposing portion and a first other opposing portion. A direction from the first opposing portion to the first other opposing portion is along the first direction. The support portion includes a first support region connected to the first portion and the first opposing portion. The first linking portion is connected to the first other portion and the first other opposing portion. The first connecting portion is connected to the first linking portion. The first linking portion is provided between the first beam and the first connecting portion and between the first opposing beam and the first connecting portion. A first connecting portion width along the second direction of the first connecting portion is narrower than a first linking portion width along the second direction of the first linking portion.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic plan view illustrating a sensor according to a first embodiment.

FIGS. 2A to 2D are schematic cross-sectional views illustrating the sensor according to the first embodiment.

Figure 2A:
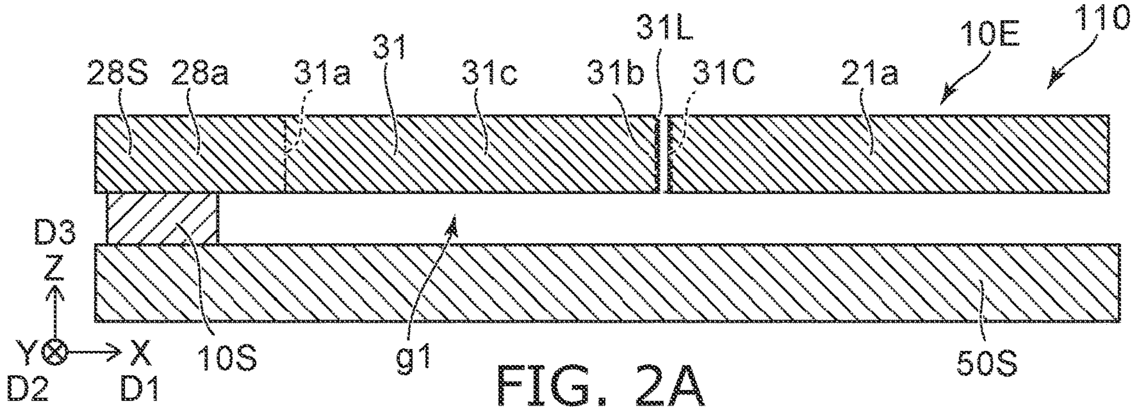
FIGS. 2A to 2D are schematic cross-sectional views illustrating the sensor according to the first embodiment.
Figure 2B:
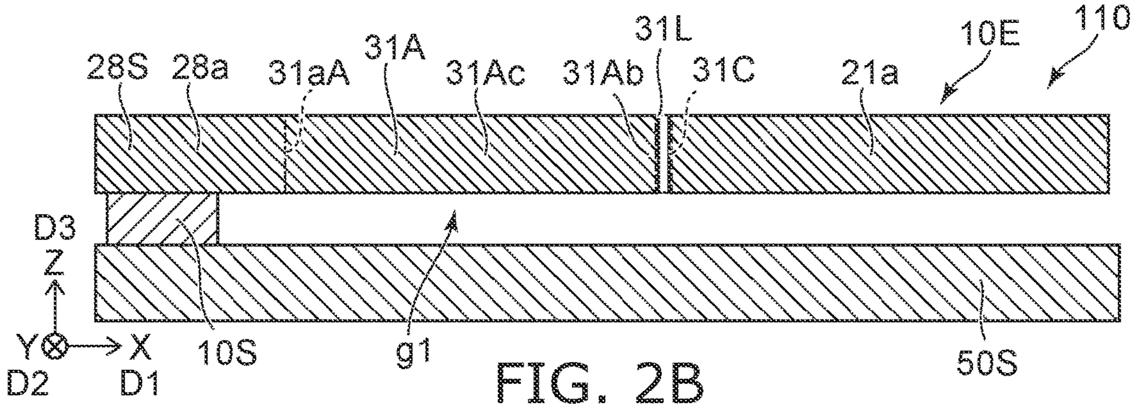
Figure 2C:
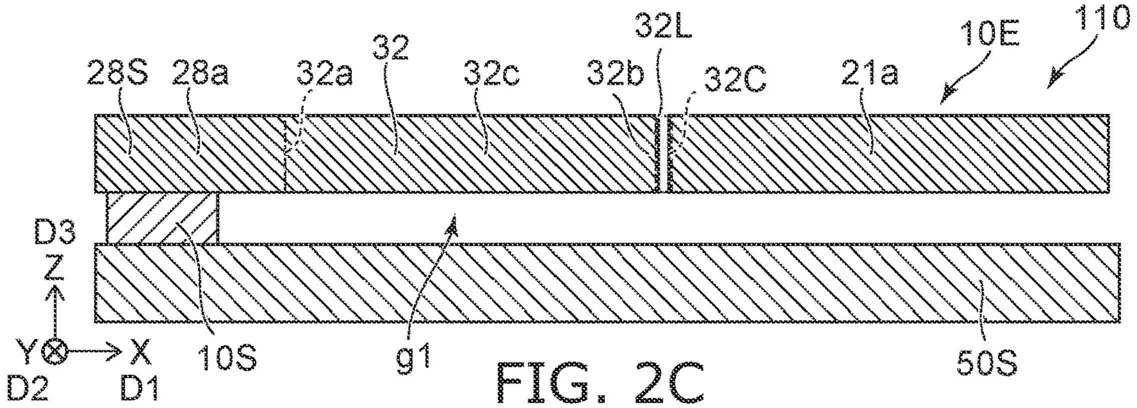
Figure 2D:
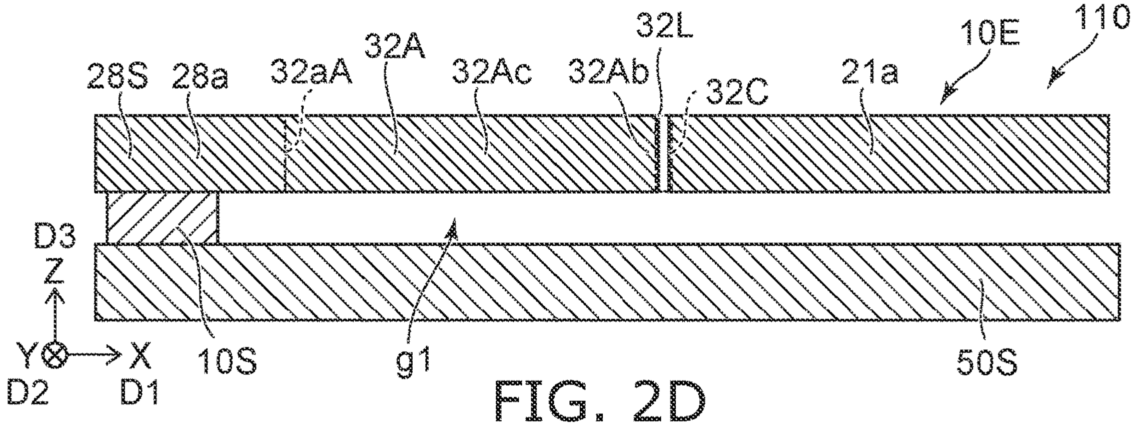

FIG. 2A is a cross-sectional view taken along the line A1-A2 in FIG. 1. FIG. 2B is a cross-sectional view taken along the line A3-A4 of FIG. 1. FIG. 2C is a cross-sectional view taken along the line A5-A6 of FIG. 1. FIG. 2D is a cross-sectional view taken along the line A7-A8 of FIG. 1.

Figure 3:
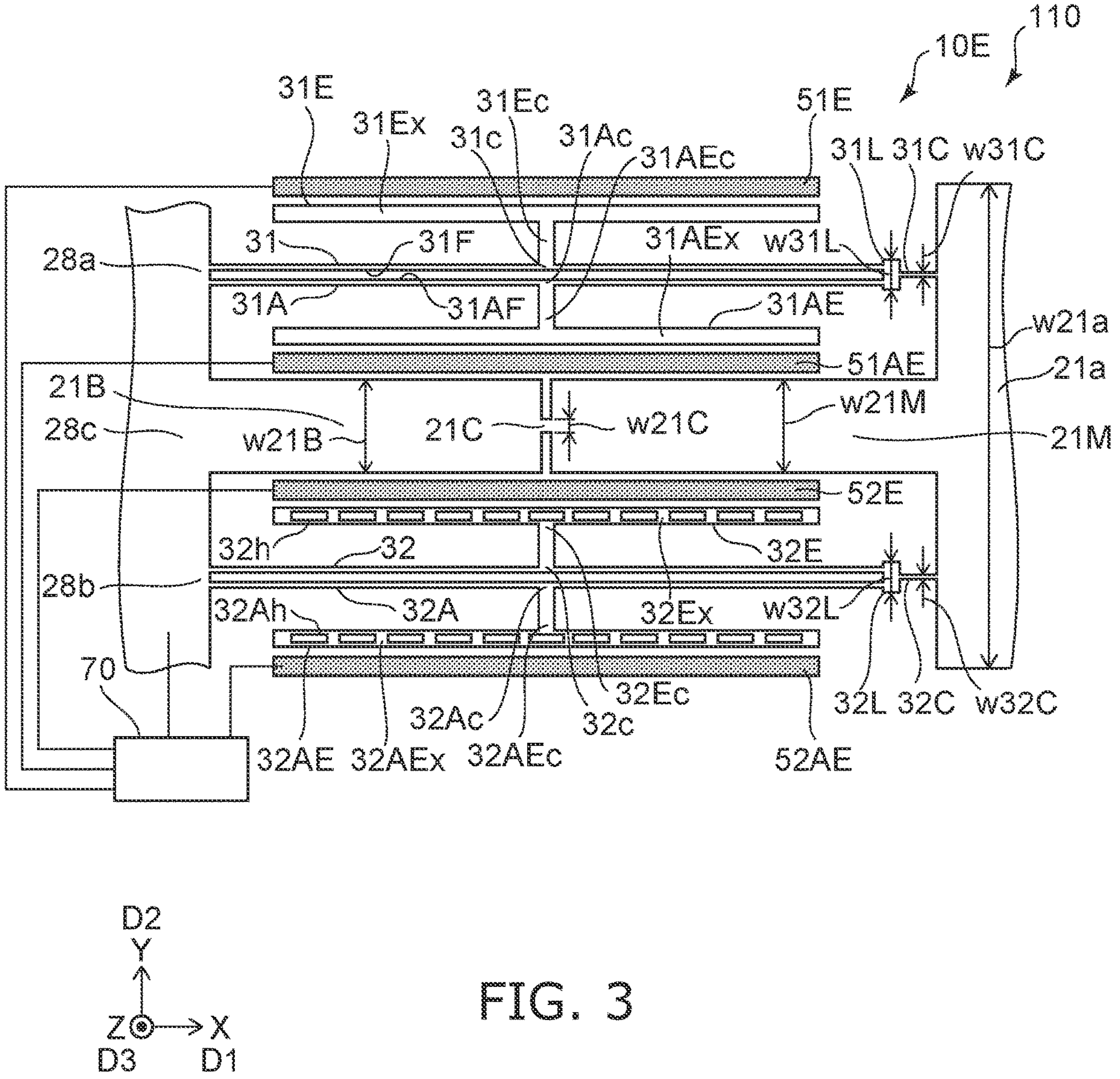
FIG. 3 is a schematic plan view illustrating a part of the sensor according to the first embodiment.

FIG. 3 is a schematic plan view illustrating a part of the sensor according to the first embodiment.

As shown in FIG. 1 and FIGS. 2A to 2D, a sensor 110 according to the embodiment includes an element section 10E. The element section 10E includes a first beam 31, a first opposing beam 31A, a support portion 28S, a first linking portion 31L, and a first connecting portion 31C.

The first beam 31 includes a first portion 31*a* and a first other portion 31*b*. A direction from the first portion 31*a* to the first other portion 31*b* is along a first direction D1.

A second direction D2 from the first opposing beam 31A to the first beam 31 crosses the first direction D1. The second direction D2 may be perpendicular to the first direction D1. The first opposing beam 31A includes a first opposing portion 31Aa and a first other opposing portion 31Ab. A direction from the first opposing portion 31Aa to the first other opposing portion 31Ab is along the first direction D1.

The support portion 28S includes a first support region 28*a*. The first support region 28*a* is connected to, for example, the first portion 31*a* and the first opposing portion 31A*a*.

The first linking portion 31L is connected to the first other portion 31*b* and the first other opposing portion 31A*b*. The first connecting portion 31C is connected to the first linking portion 31L. The first linking portion 31L is provided between the first beam 31 and the first connecting portion 31C and between the first opposing beam 31A and the first connecting portion 31C.

As shown in FIG. 3, a width (length) along the second direction D2 of the first connecting portion 31C is defined as a first connecting portion width w31C. A width (length) along the second direction D2 of the first linking portion 31L is defined as a first linking portion width w31L. As shown in FIG. 3, the first connecting portion width w31C is narrower than the first linking portion width w31L. For example, the first connecting portion 31C deforms more easily than the first linking portion 31L.

In the embodiment, one of each of the two beams (the first portion 31*a* and the first opposing portion 31A*a*) is connected to the first support region 28*a*. The other one of the two beams (the first other portion 31*b* and the first other opposing portion 31A*b*) is connected to the first connecting portion 31C being easily deformable via the first linking portion 31L.

By the first linking portion 31L and the first connecting portion 31C, two beams are easily deformed uniformly, for example. By providing the first connecting portion 31C being easily deformable, the received force is efficiently transmitted to the two beams. For example, it is easy to obtain high sensitivity. For example, it becomes easier to obtain a large scale-factor. For example, it is easy to obtain a highly linear scale-factor. It becomes easier to obtain highly stable vibration (resonance).

Meanwhile, the other ends of the two beams are connected to the first support region 28*a*. For example, no deformable connection is provided between the other ends of the two beams and the first support region 28*a*. For example, the other ends of the two beams are directly connected with the first support region 28*a*. Thereby, for example, stable resonance characteristics can be obtained. For example, a high Q value is obtained at the portion where the two beams and the first support region 28*a* are connected.

As described above, in the sensor 110, the configuration of one end of the two beams and the configuration of the other end are asymmetrical. According to the embodiment, a high linearity scale-factor, a large scale-factor, and a high operational stability can be provided. A high Q value is obtained. According to the embodiment, it is possible to provide a sensor whose characteristics can be improved.

In general, the configuration of one end of the two beams is the same as the configuration of the other end of the two beams. In the case where both ends of the two beams are each connected to a flexible connection via a linking portion, it is difficult to obtain a high Q value. In the case where both ends of the two beams are each directly connected to the support region, it is difficult to obtain a highly linear scale-factor.

As shown in FIG. 1 and FIGS. 2A-2D, the sensor 110 may include a base 50S and a first fixed portion 10S. The first fixed portion 10S is fixed to the base 50S. A third direction D3 from the base 50S to the first fixed portion 10S crosses a plane including the first direction D1 and the second direction D2.

The first direction D1 is defined as an X-axis direction. One direction perpendicular to the X-axis direction is defined as a Y-axis direction. A direction perpendicular to the X-axis direction and the Y-axis direction is defined as a Z-axis direction. The second direction D2 may be, for example, the Y-axis direction. The third direction D3 may be, for example, the Z-axis direction.

The first support region 28*a* is supported by the first fixed portion 10S. For example, the first fixed portion 10S includes a first fixed region 10Sa. The first support region 28*a* is supported by the first fixed region 10Sa.

As shown in FIGS. 2A to 2D, a first gap g1 is provided between the base 50S and the element section 10E.

The element section 10E includes a movable member 20M supported by the support portion 28S. The movable member 20M includes a first movable portion 21*a*. The first connecting portion 31C is connected to the first movable portion 21*a*.

For example, the movable member 20M (first movable portion 21*a*) is displaced according to a force (e.g., acceleration) being received. The displacement is efficiently transmitted to the first beam 31 and the first opposing beam 31A via the first connecting portion 31C and the first linking portion 31L. A stable deformation occurs in the two beams depending on the force being received. For example, the resonant frequencies of these beams are affected by the deformation (stress). By detecting the change in the resonance frequency, the force being received can be detected.

As shown in FIG. 3, the movable member 20M may include a first movable base portion 21B and a first movable connecting portion 21C. The first movable base portion 21B is supported by the support portion 28S. In this example, the first movable base portion 21B is supported by a third support region 28*c* of the support portion 28S. The first movable connecting portion 21C is provided between the first movable base portion 21B and the first movable portion 21*a*. The first movable connecting portion 21C connects the first movable portion 21*a* to the first movable base portion 21B.

As shown in FIG. 3, a width (length) of the first movable connecting portion 21C in a crossing direction (in this example, the second direction D2) crossing the direction (in this example, the first direction D1) from the first movable base portion 21B to the first movable connecting portion 21C is defined as a first movable connecting portion width w21C. A width (length) of the first movable base portion 21B in the crossing direction is defined as a first movable base portion width w21B. A width (length) of the first movable portion 21*a* in the crossing direction is defined as a first movable portion width w21*a*. The first movable connecting portion width w21C is narrower than the first movable base portion width w21B. The first movable connecting portion width w21C is narrower than the first movable portion width w21*a*.

In this example, the movable member 20M includes a first movable intermediate portion 21M provided between the first movable connecting portion 21C and the first movable portion 21*a*. In the second direction D2, the first opposing beam 31A is provided between the first movable intermediate portion 21M and the first beam 31. A width (length) of the first movable intermediate portion 21M in the crossing direction (in this example, the second direction D2) is defined as a first movable intermediate portion width w21M. The first movable connecting portion width w21C is narrower than the first movable intermediate portion width w21M. The first movable connecting portion 21C functions, for example, as a pivot portion. For example, the force is amplified by leverage action. For example, the first movable portion 21*a* is easily displaced.

As shown in FIG. 3, the first beam 31 further includes a first intermediate portion 31*c* between the first portion 31*a* and the first other portion 31*b*. The first opposing beam 31A further includes a first opposing intermediate portion 31A*c* between the first opposing portion 31A*a* and the first other opposing portion 31A*b*. The element section 10E includes a first beam electrode 31E connected to the first intermediate portion 31*c* and a first opposing beam electrode 31AE connected to the first opposing intermediate portion 31A*c*.

In this example, the first beam 31 is provided between the first opposing beam electrode 31AE and the first beam electrode 31E. The first opposing beam 31A is provided between the first opposing beam electrode 31AE and the first beam 31.

As shown in FIG. 3, in this example, the first beam electrode 31E includes a first extending portion 31Ex and a first extending connecting portion 31Ec. The first extending portion 31Ex extends along the first direction D1. The first extending connecting portion 31Ec connects the first extending portion 31Ex to the first intermediate portion 31*c*. The first extending portion 31Ex extends along the second direction D2.

As shown in FIG. 3, the first opposing beam electrode 31AE includes a first opposing extending portion 31AEx and a first opposing extending connecting portion 31AEc. The first opposing extending portion 31AEx extends along the first direction D1. The first opposing extending connecting portion 31AEc connects the first opposing extending portion 31AEx to the first opposing intermediate portion 31Ac. The first opposing extending connecting portion 31AEc extends along the second direction D2.

As shown in FIG. 3, the element section 10E may further include a first fixed electrode 51E and a first opposing fixed electrode 51AE fixed to the base 50S. The first fixed electrode 51E faces the first beam electrode 31E. The first opposing fixed electrode 51AE faces the first opposing beam electrode 31AE. A direction from the first fixed electrode 51E to the first beam electrode 31E is along the second direction D2. A direction from the first opposing fixed electrode 51AE to the first opposing beam electrode 31AE is along the second direction D2.

As shown in FIG. 3, a controller 70 may be provided. The controller 70 may be included in the sensor 110. The controller 70 may be provided separately from the sensor 110. The controller 70 is configured to, for example, apply a first AC signal between the first fixed electrode 51E and the first beam electrode 31E. The controller 70 is configured to detect, for example, a first signal generated between the first opposing fixed electrode 51AE and the first opposing beam electrode 31AE. The force (acceleration) being received can be detected by the first signal. In the embodiment, the position of the first beam 31 and the position of the first opposing beam 31A may be interchanged.

As shown in FIG. 3, the first beam 31 includes a first beam face 31F facing the first opposing beam 31A. The first opposing beam 31A includes a first opposing beam face 31AF facing the first beam 31. The first beam face 31F and the first opposing beam face 31AF extend along the first direction D1. The first beam face 31F and the first opposing beam face 31AF are flat, for example. Thereby, for example, the distance between the first beam 31 and the first opposing beam 31A can be appropriately shortened. For example, substantially the same stress tends to be applied to two beams. It becomes easier to obtain stable resonance characteristics.

As shown in FIG. 3, the element section 10E may further include a second beam 32, a second opposing beam 32A, a second linking portion 32L, and a second connecting portion 32C. The support portion 28S further includes a second support region 28*b*.

The second beam 32 includes a second portion 32*a* and a second other portion 32*b*. A direction from the second portion 32*a* to the second other portion 32*b* is along the first direction D1. The second opposing beam 32A includes a second opposing portion 32Aa and a second other opposing portion 32Ab. A direction from the second opposing portion 32Aa to the second other opposing portion 32Ab is along the first direction D1.

The second support region 28*b* is connected to the second portion 32*a* and the second opposing portion 32Aa. The second linking portion 32L is connected to the second other portion 32*b* and the second other opposing portion 32Ab. The second connecting portion 32C is connected to the second linking portion 32L. The second linking portion 32L is provided between the second beam 32 and the second connecting portion 32C and between the second opposing beam 32A and the second connecting portion 32C.

A second connecting portion width w32C along the second direction D2 of the second connecting portion 32C is narrower than a second linking portion width w32L along the second direction D2 of the second linking portion 32L. In this example, a direction from the second beam 32 to the first beam 31 is along the second direction D2.

In the portion including the second beam 32, the second opposing beam 32A, the second linking portion 32L, and the second connecting portion 32C also, a high linear scale-factor, a large scale-factor, and high operation stability can be obtained, in the same way as the portion including the first beam 31, the first opposing beam 31A, the first linking portion 31L, and the first connecting portion 31C. High Q value is obtained.

As shown in FIG. 3, the second beam 32 further includes a second intermediate portion 32*c* between the second portion 32*a* and the second other portion 32*b*. The second opposing beam 32A further includes a second opposing intermediate portion 32Ac between the second opposing portion 32Aa and the second other opposing portion 32Ab.

The element section 10E includes a second beam electrode 32E connected to the second intermediate portion 32*c* and a second opposing beam electrode 32AE connected to the second opposing intermediate portion 32Ac. For example, the second beam 32 is provided between the second opposing beam electrode 32AE and the second beam electrode 32E. For example, the second opposing beam 32A is provided between the second opposing beam electrode 32AE and the second beam 32.

As shown in FIG. 3, the second beam electrode 32E includes a second extending portion 32Ex and a second extending connecting portion 32Ec. The second extending portion 32Ex extends along the first direction D1. The second extending connecting portion 32Ec connects the second extending portion 32Ex to the second intermediate portion 32*c*. The second extending connecting portion 32Ec extends along the second direction D2.

The second opposing beam electrode 32AE includes a second opposing extending portion 32AEx and a second opposing extending connecting portion 32AEc. The second opposing extending portion 32AEx extends along the first direction D1. The second opposing extending connecting portion 32AEc connects the second opposing extending portion 32AEx to the second opposing intermediate portion 32Ac. The second opposing extending connecting portion 32AEc extends along the second direction D2.

As shown in FIG. 3, the element section 10E may further include a second fixed electrode 52E and a second opposing fixed electrode 52AE fixed to the base 50S. The second fixed electrode 52E faces the second beam electrode 32E. The second opposing fixed electrode 52AE faces the second opposing beam electrode 32AE. A direction from the second fixed electrode 52E to the second beam electrode 32E is along the second direction D2. A direction from the second opposing fixed electrode 52AE to the second opposing beam electrode 32AE is along the second direction D2.

The controller 70 is configured to, for example, apply a second AC signal between the second fixed electrode 52E and the second beam electrode 32E. The controller 70 is configured to detect, for example, a second signal generated between the second opposing fixed electrode 52AE and the second opposing beam electrode 32AE. The force (acceleration) being received can be detected by the second signal. In the embodiment, the position of the second beam 32 and the position of the second opposing beam 32A may be interchanged.

The controller 70 may output a signal including a difference between the first signal and the second signal. For example, by a signal including the difference in resonant frequencies, detection with higher sensitivity and with higher accuracy can be possible.

As shown in FIG. 3, the second beam electrode 32E may include a second hole 32*h*. The second opposing beam electrode 32AE may include a second opposing hole 32Ah. The second beam electrode 32E may have a configuration different from a configuration of the first beam electrode 31E. The second opposing beam electrode 32AE may have a configuration different from a configuration of the first opposing beam electrode 31AE. Asymmetric configurations may also be applied. For example, it becomes easier to obtain detection with a wide dynamic range.

For example, the first beam electrode 31E and the second beam electrode 32E may satisfy at least one of a first condition, a second condition, a third condition, a fourth condition, a fifth condition, a sixth condition, a seventh condition or an eighth condition.

In the first condition, a second mass of the second beam electrode 32E is different from a first mass of the first beam electrode 31E. In the second condition, a second thickness along the third direction D3 of the second beam electrode 32E is different from a first thickness along the third direction D3 of the first beam electrode 31E. In the third condition, at least a part of a second material included in the second beam electrode 32E is different from at least a part of a first material included in the first beam electrode 31E.

In the fourth condition, a second size of the second hole 32*h* included in the second beam electrode 32E is different from a first size of the first hole included in the first beam electrode 31E. Alternatively, the first beam electrode 31E does not include the first hole. In the fifth condition, a second density of the second holes 32*h* is different from a first density of the first holes. In the sixth condition, a second number of second holes 32*h* is different from a first number of first holes. In the seventh condition, a second shape of the second hole 32*h* is different from a first shape of the first hole. In the eighth condition, a second layer structure of the second beam electrode 32E is different from a first layer structure of the first beam electrode 31E.

The first to eighth conditions as described above may be applied to the first opposing beam electrode 31AE and the second opposing beam electrode 32AE.

Figure 4:
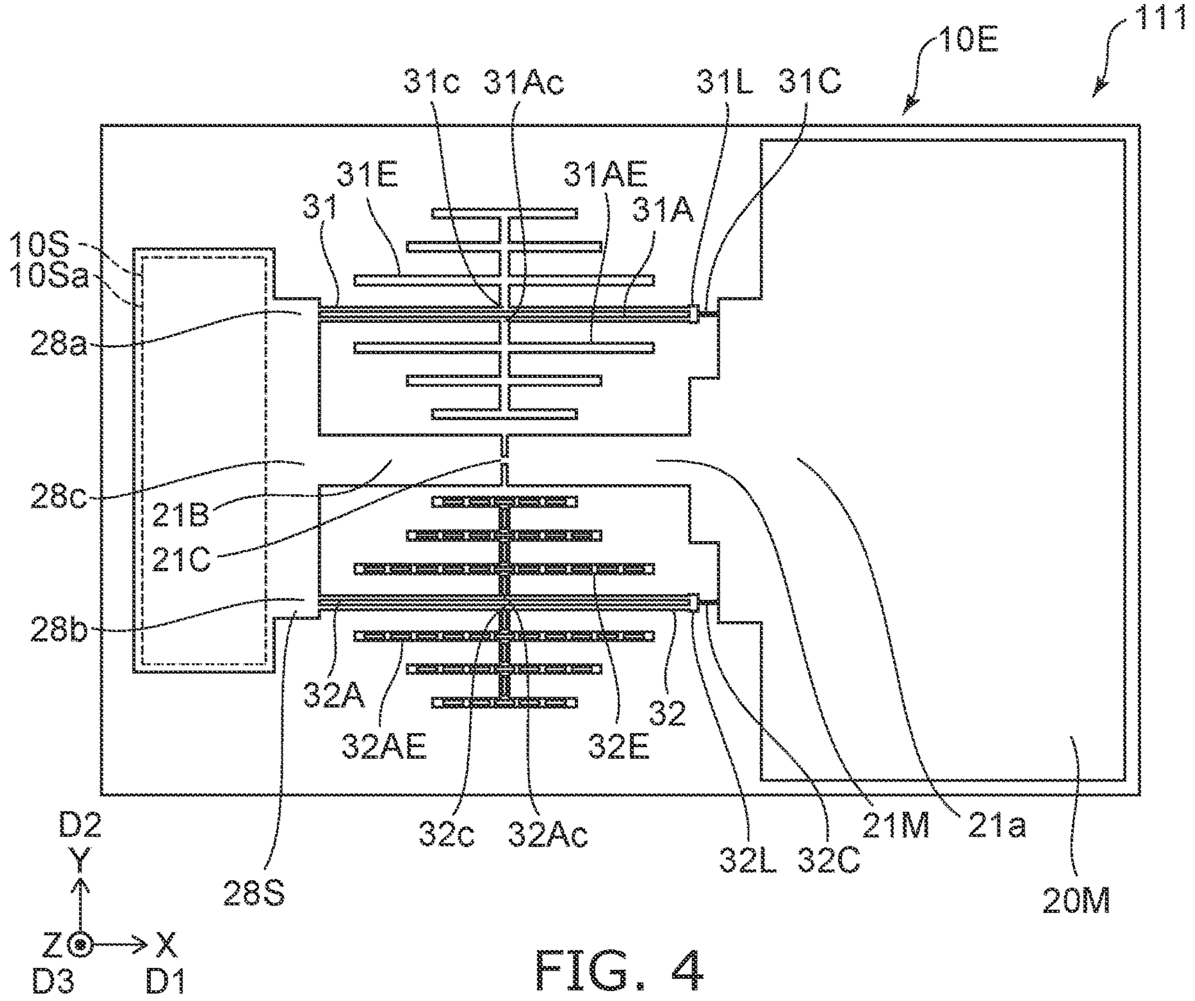
FIG. 4 is a schematic plan view illustrating a sensor according to the first embodiment.

FIG. 4 is a schematic plan view illustrating a sensor according to the first embodiment.

Figure 5A:
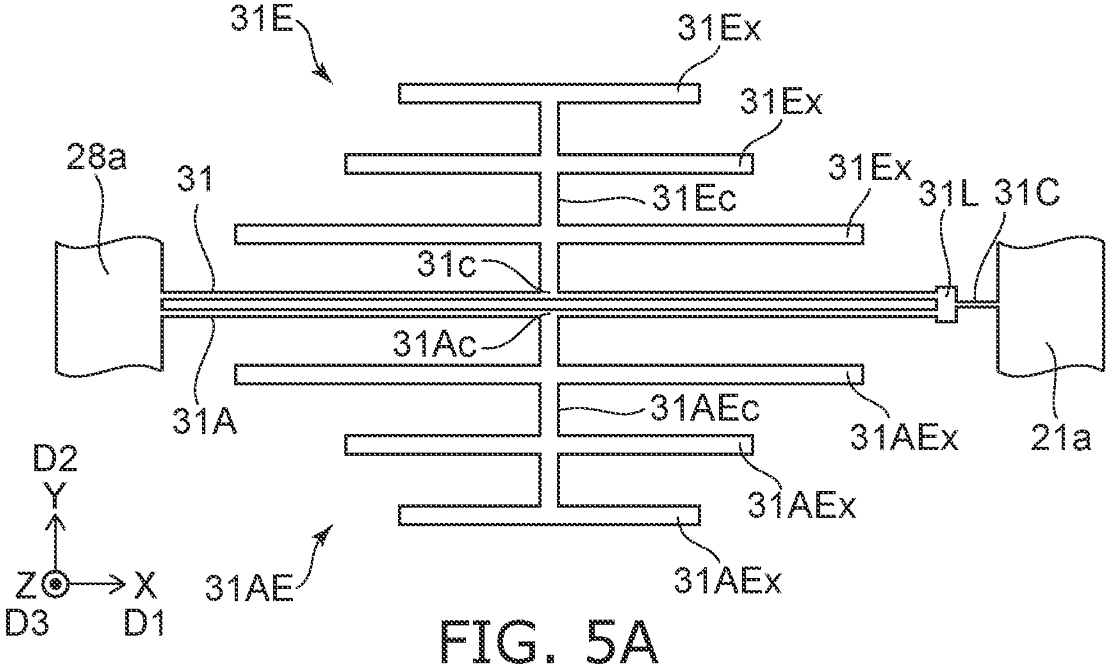
FIGS. 5A and 5B are schematic plan views illustrating a part of the sensor according to the first embodiment.
Figure 5B:
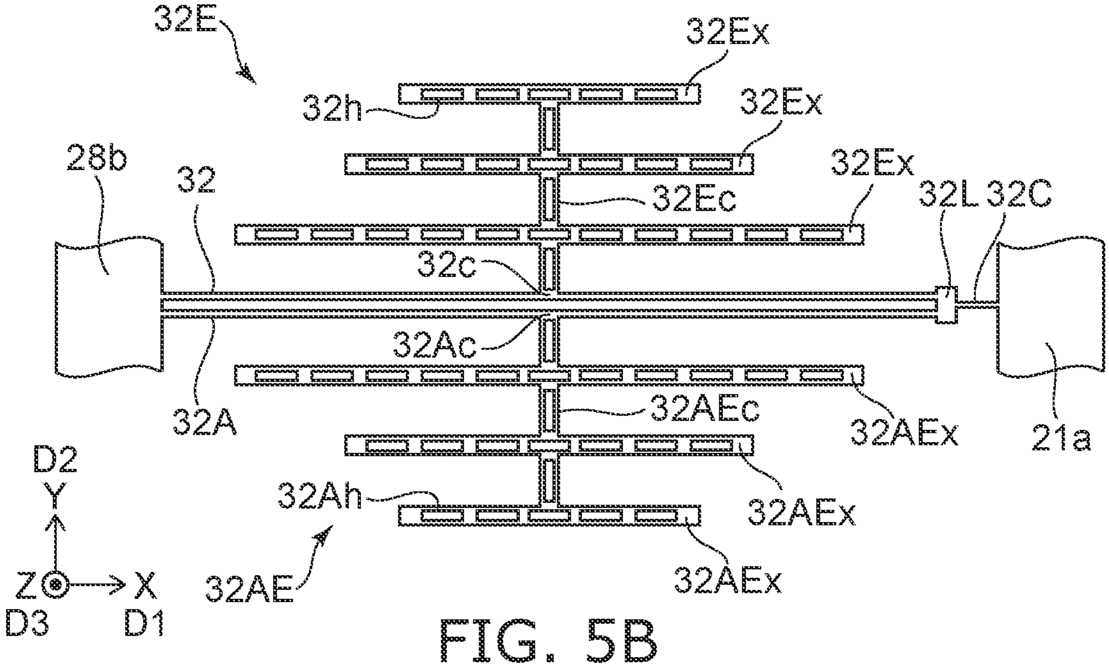

FIGS. 5A and 5B are schematic plan views illustrating a part of the sensor according to the first embodiment.

As shown in FIG. 4, in a sensor 111 according to the embodiment, the configurations of the first beam electrode 31E and the first opposing beam electrode 31AE are different from those in the sensor 110. Other configurations of the sensor 111 may be the same as the configuration of the sensor 110.

As shown in FIG. 5A, in the sensor 111, the first beam electrode 31E includes a plurality of first extending portions 31Ex. One of the plurality of first extending portions 31Ex is provided between the first beam 31 and another one of the plurality of first extending portions 31Ex. A length of the one of the first extending portions 31Ex along the first direction D1 is longer than a length of the other one of the first extending portions 31Ex along the first direction D1.

As shown in FIG. 5A, in the sensor 111, the first opposing beam electrode 31AE includes a plurality of first opposing extending portions 31AEx. One of the plurality of first opposing extending portions 31AEx is provided between the first opposing beam 31A and another one of the plurality of first opposing extending portion 31AEx. A length of the one of the plurality of first opposing extending portions 31AEx along the first direction D1 is longer than a length of the other one of the plurality of first opposing extending portions 31AEx along the first direction D1.

With such a configuration, the area of the beam electrodes can be increased. Detection with higher sensitivity becomes possible.

As shown in FIG. 5B, the second beam electrode 32E includes a plurality of second extending portions 32Ex. One of the plurality of second extending portions 32Ex is provided between the second beam 32 and another one of the plurality of second extending portions 32Ex. A length of the one of the plurality of second extending portions 32Ex along the first direction D1 is longer than a length of the other one of the plurality of second extending portions 32Ex along the first direction D1.

As shown in FIG. 5B, the second opposing beam electrode 32AE includes a plurality of second opposing extending portions 32AEx. One of the plurality of second opposing extending portions 32AEx is provided between the second opposing beam 32A and another one of the plurality of second opposing extending portions 32AEx. Ae length of the one of the plurality of second opposing extending portions 32AEx along the first direction D1 is longer than a length of the other one of the plurality of second opposing extending portions 32AEx along the first direction D1.

In the sensor 111, the first beam electrode 31E and the second beam electrode 32E may satisfy at least one of the first to eighth conditions described above. The first opposing beam electrode 31AE and the second opposing beam electrode 32AE may satisfy at least one of the first to eighth conditions described above.

Figure 6:
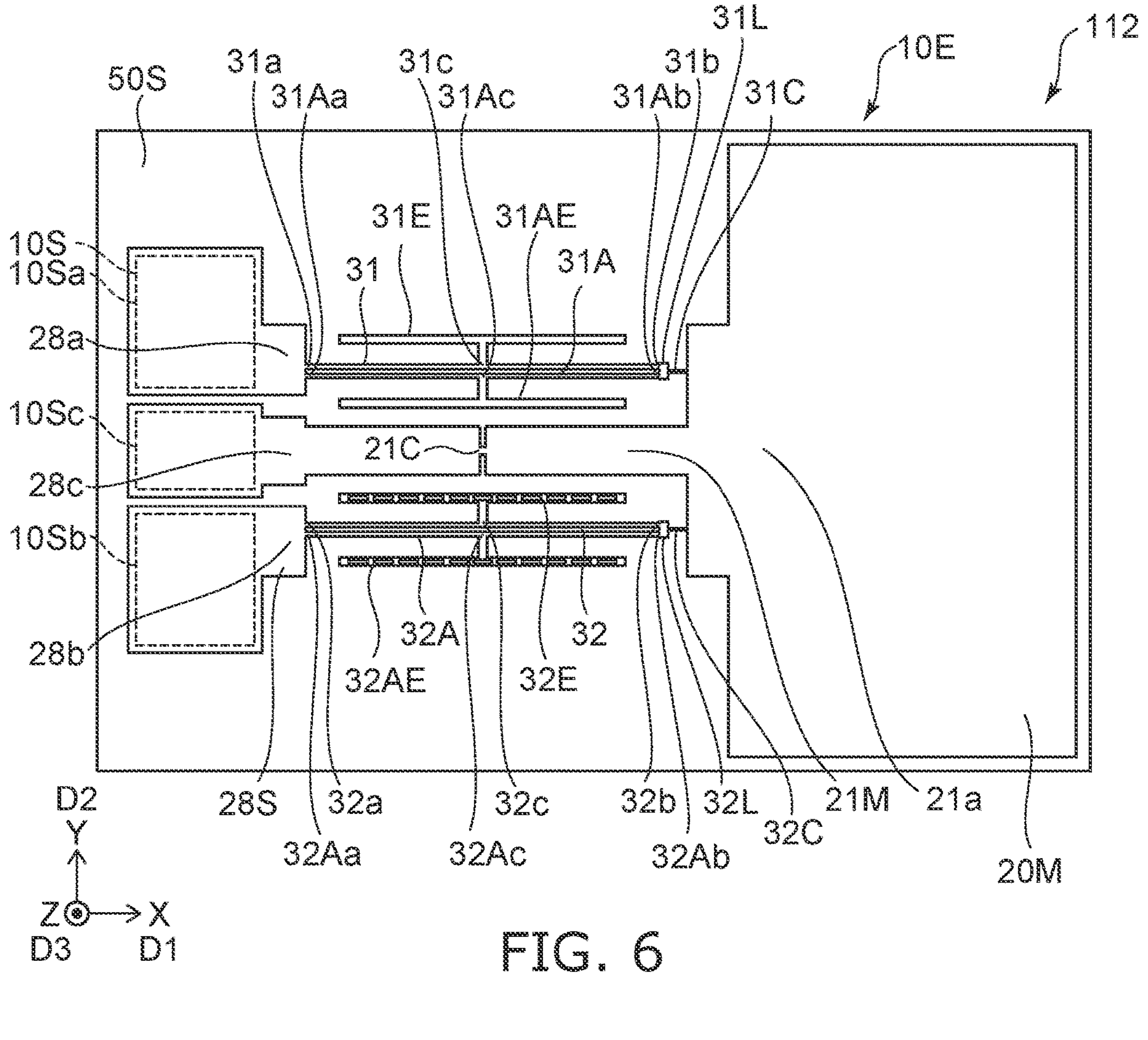
FIG. 6 is a schematic plan view illustrating a sensor according to the first embodiment.

FIG. 6 is a schematic plan view illustrating a sensor according to the first embodiment.

As shown in FIG. 6, in a sensor 112 according to the embodiment, the first fixed portion 10S includes the first fixed region 10Sa, a second fixed region 10Sb, and a third fixed region 10Sc. Except for this, the configuration of the sensor 112 may be the same as the configuration of the sensor 110. In the sensor 112, the first support region 28*a* is supported by the first fixed region 10Sa. The second support region 28*b* is supported by the second fixed region 10Sb. The third support region 28*c* is supported by the third fixed region 10Sc.

Figure 7:
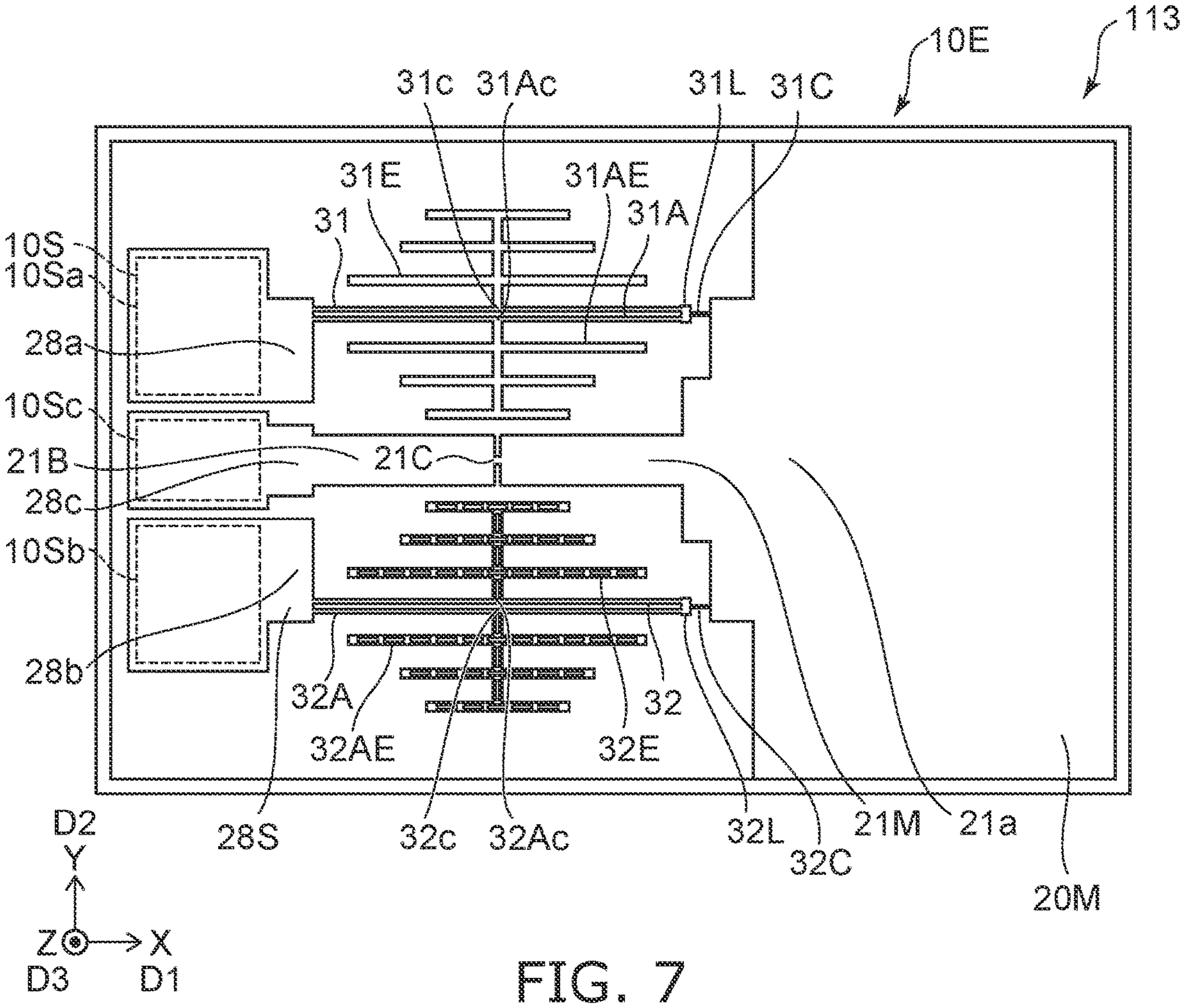
FIG. 7 is a schematic plan view illustrating a sensor according to the first embodiment.

FIG. 7 is a schematic plan view illustrating a sensor according to the first embodiment.

As shown in FIG. 7, in a sensor 113 according to the embodiment, the first fixed portion 10S includes the first fixed region 10Sa, the second fixed region 10Sb, and the third fixed region 10Sc. Except for this, the configuration of the sensor 113 may be the same as the configuration of the sensor 111.

Figure 8:
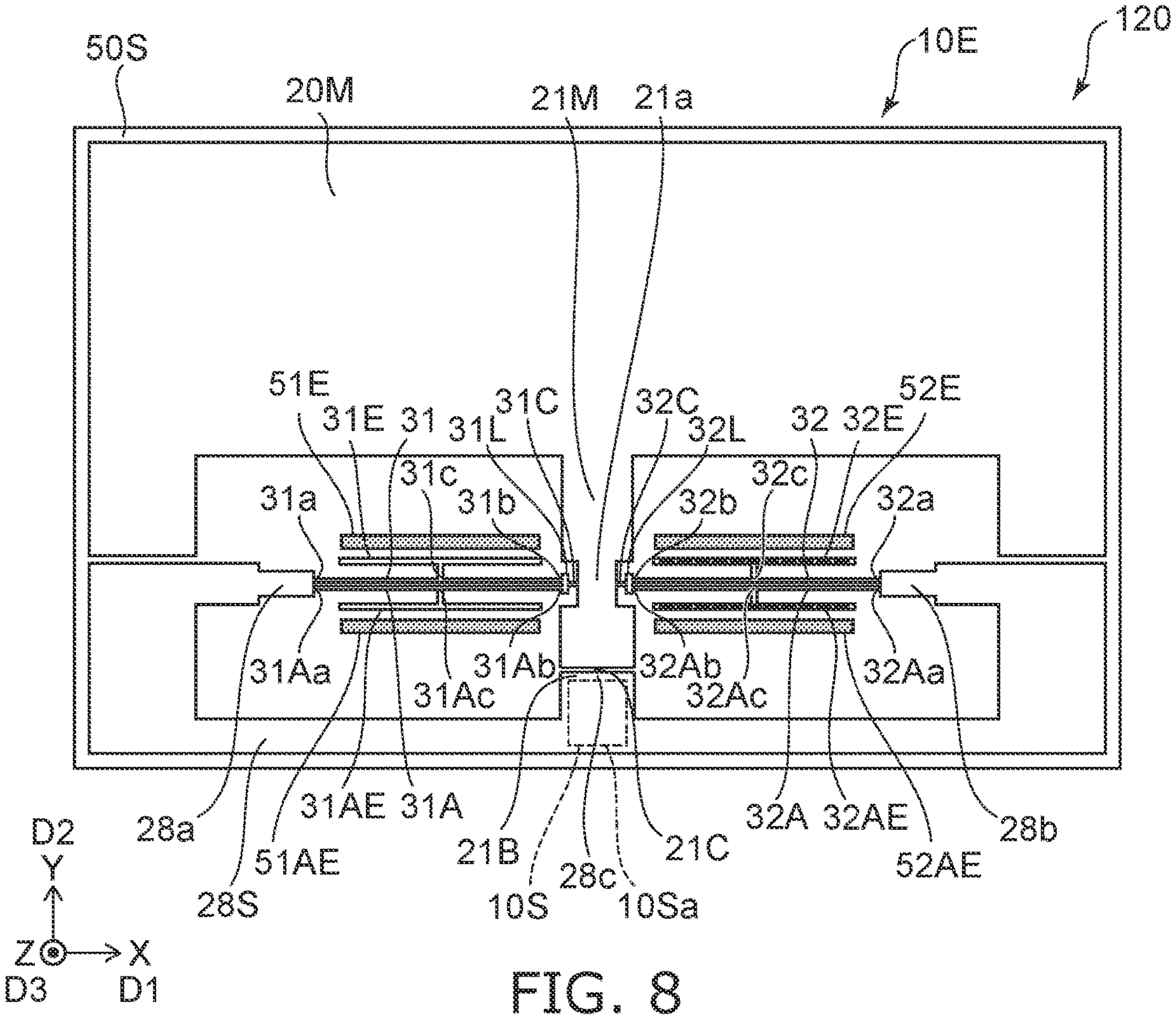
FIG. 8 is a schematic plan view illustrating a sensor according to the first embodiment.

FIG. 8 is a schematic plan view illustrating a sensor according to the first embodiment.

As shown in FIG. 8, in a sensor 120 according to the embodiment, the element section 10E includes the first beam 31, the first opposing beam 31A, the first linking portion 31L, the first connecting portion 31C, the second beam 32, the second opposing beams 32A, the second linking portion 32L, and the second connecting portion 32C. In sensor 120, the relative positions of the first beam 31 and the second beam 32 are different from those in the sensor 110. Except for this, the configuration of the sensor 120 may be the same as the configuration of the sensor 110.

In the sensor 120, for example, the direction from the second beam 32 to the first beam 31 is along the first direction D1. For example, the first linking portion 31L is provide between the first support region 28*a* and the second support region 28*b* in the first direction D1. The second linking portion 32L is provided between the first linking portion 31L and the second support region 28*b* in the first direction D1. The sensor 120 also provides a highly linear scale-factor, a large scale-factor, and high operational stability. A high Q value is obtained. A sensor capable of improving characteristics can be provided. For example, the force is amplified by leverage action of the first movable connecting portion 21C.

Figure 9:
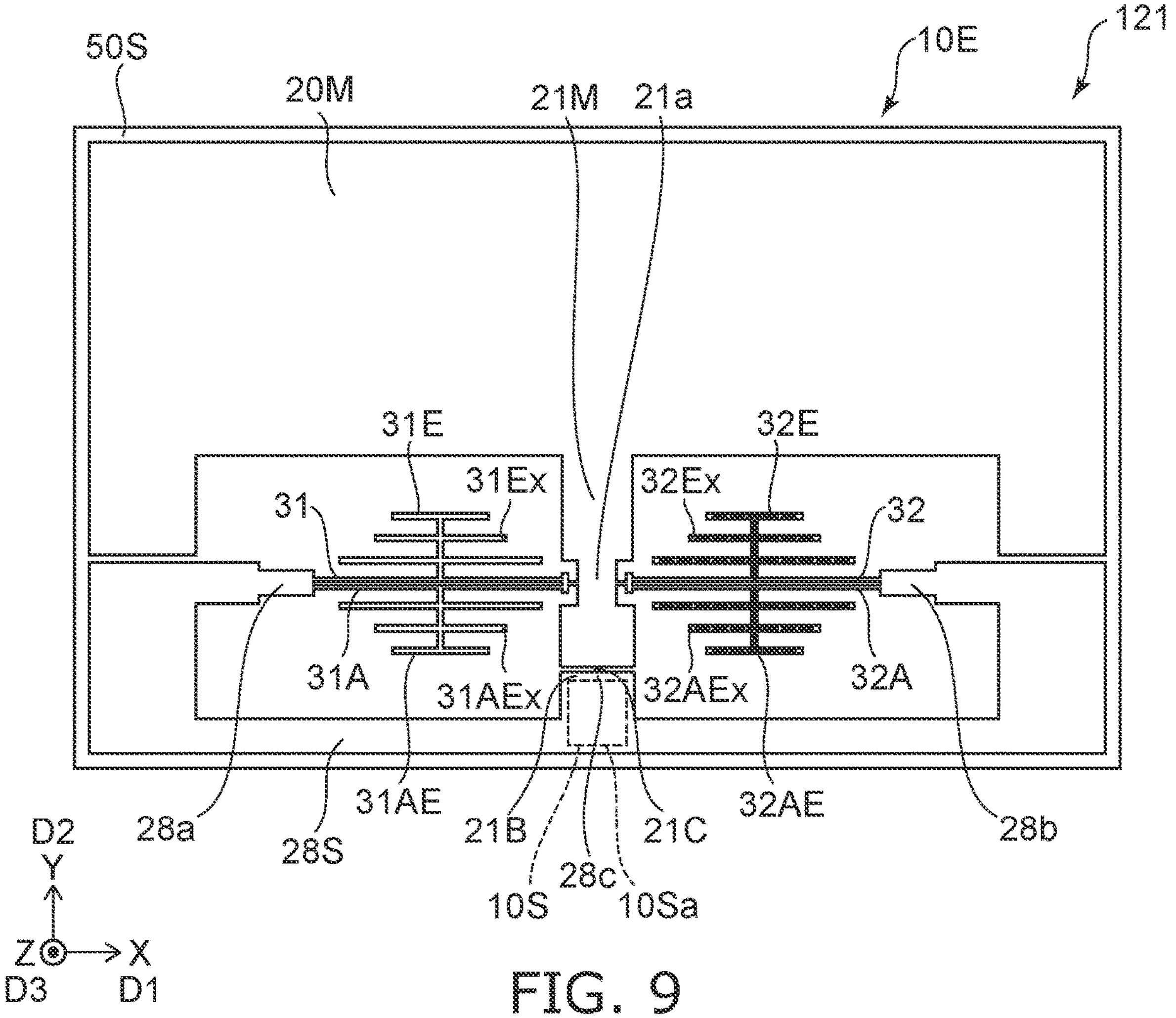
FIG. 9 is a schematic plan view illustrating a sensor according to the first embodiment.

FIG. 9 is a schematic plan view illustrating a sensor according to the first embodiment.

As shown in FIG. 9, in a sensor 121 according to the embodiment, the plurality of first extending portions 31Ex, the plurality of first opposing extending portions 31AEx, the plurality of second extending portions 32Ex, and the plurality of second opposing extending portions 32AEx are provided. Except for this, the configuration of the sensor 121 may be the same as the configuration of the sensor 120.

The plurality of first extending portions 31Ex, the plurality of first opposing extending portions 31AEx, the plurality of second extending portions 32Ex, and the plurality of second opposing extending portions 32AEx may have, for example, the configuration described with respect to the sensor 111.

Figure 10:
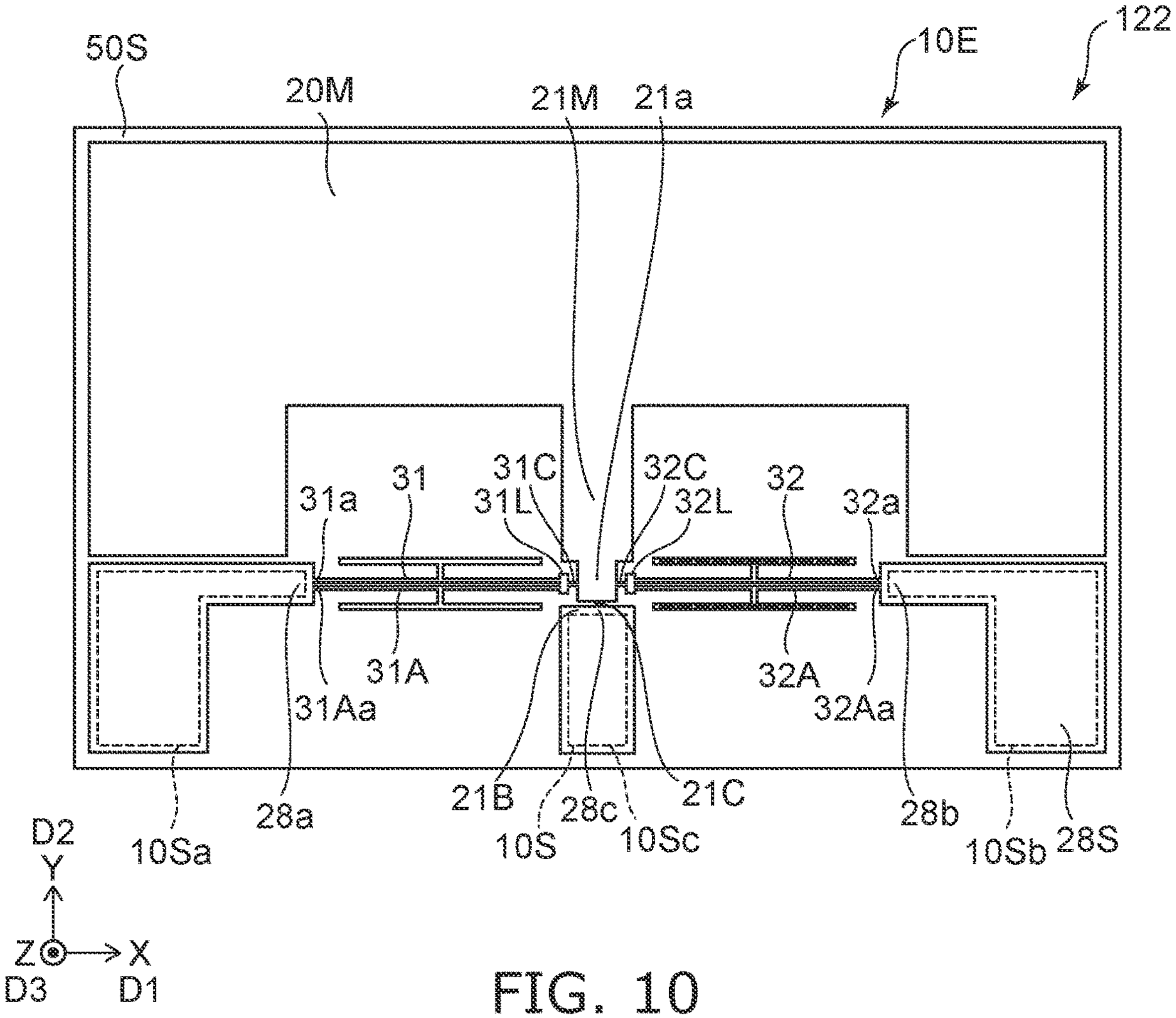
FIG. 10 is a schematic plan view illustrating a sensor according to the first embodiment.

FIG. 10 is a schematic plan view illustrating a sensor according to the first embodiment.

As shown in FIG. 10, in a sensor 122 according to the embodiment, the first fixed portion 10S includes the first fixed region 10Sa, the second fixed region 10Sb, and the third fixed region 10Sc. Except for this, the configuration of the sensor 122 may be the same as the configuration of the sensor 120. In the sensor 122, the first support region 28*a* is supported by the first fixed region 10Sa. The second support region 28*b* is supported by the second fixed region 10Sb. The third support region 28*c* is supported by the third fixed region 10Sc.

Figure 11:
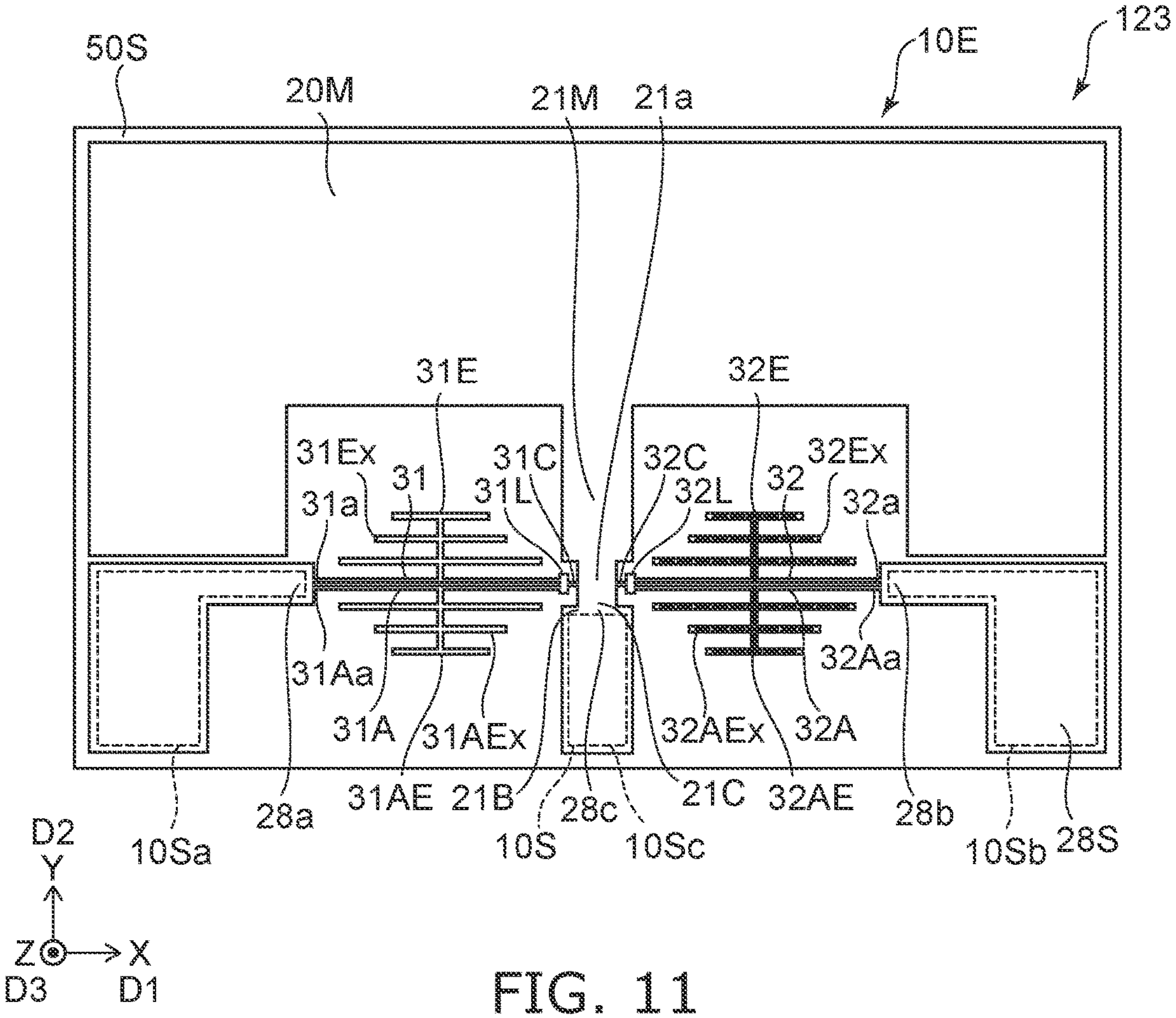
FIG. 11 is a schematic plan view illustrating a sensor according to the first embodiment.

FIG. 11 is a schematic plan view illustrating a sensor according to the first embodiment.

As shown in FIG. 11, in a sensor 123 according to the embodiment, the first fixed portion 10S includes the first fixed region 10Sa, the second fixed region 10Sb, and the third fixed region 10Sc. Except for this, the configuration of the sensor 123 may be the same as the configuration of the sensor 121.

Figure 12:
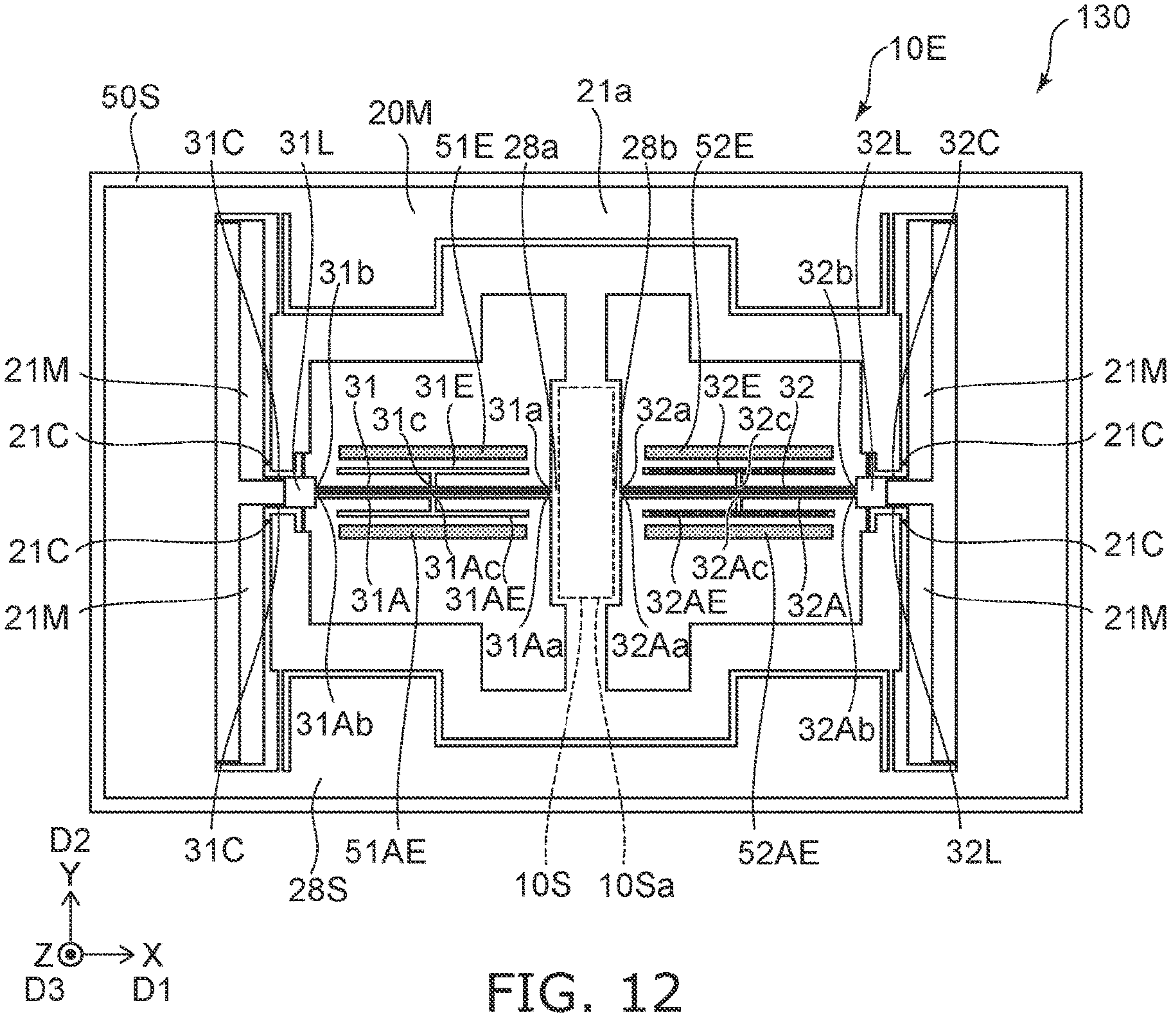
FIG. 12 is a schematic plan view illustrating a sensor according to the first embodiment.

FIG. 12 is a schematic plan view illustrating a sensor according to the first embodiment.

As shown in FIG. 12, in a sensor 130 according to the embodiment, the element section 10E includes the first beam 31, the first opposing beam 31A, the first linking portion 31L, a first connecting portion 31C, a second beam 32, a second opposing beam 32A, the second linking portion 32L, the second connecting portion 32C. In sensor 130, the configuration of first beam 31 and second beam 32 is different from that in the sensor 120. Except for this, the configuration of the sensor 130 may be the same as the configuration of the sensor 120.

In the sensor 130, the first support region 28*a* is provided between the first linking portion 31L and the second linking portion 32L in the first direction D1. The second support region 28*b* is provided between the first support region 28*a* and the second linking portion 32L in the first direction D1. The sensor 130 also provides a highly linear scale-factor, a large scale-factor, and high operational stability. A high Q value is obtained. A sensor capable of improving characteristics can be provided.

Figure 13:
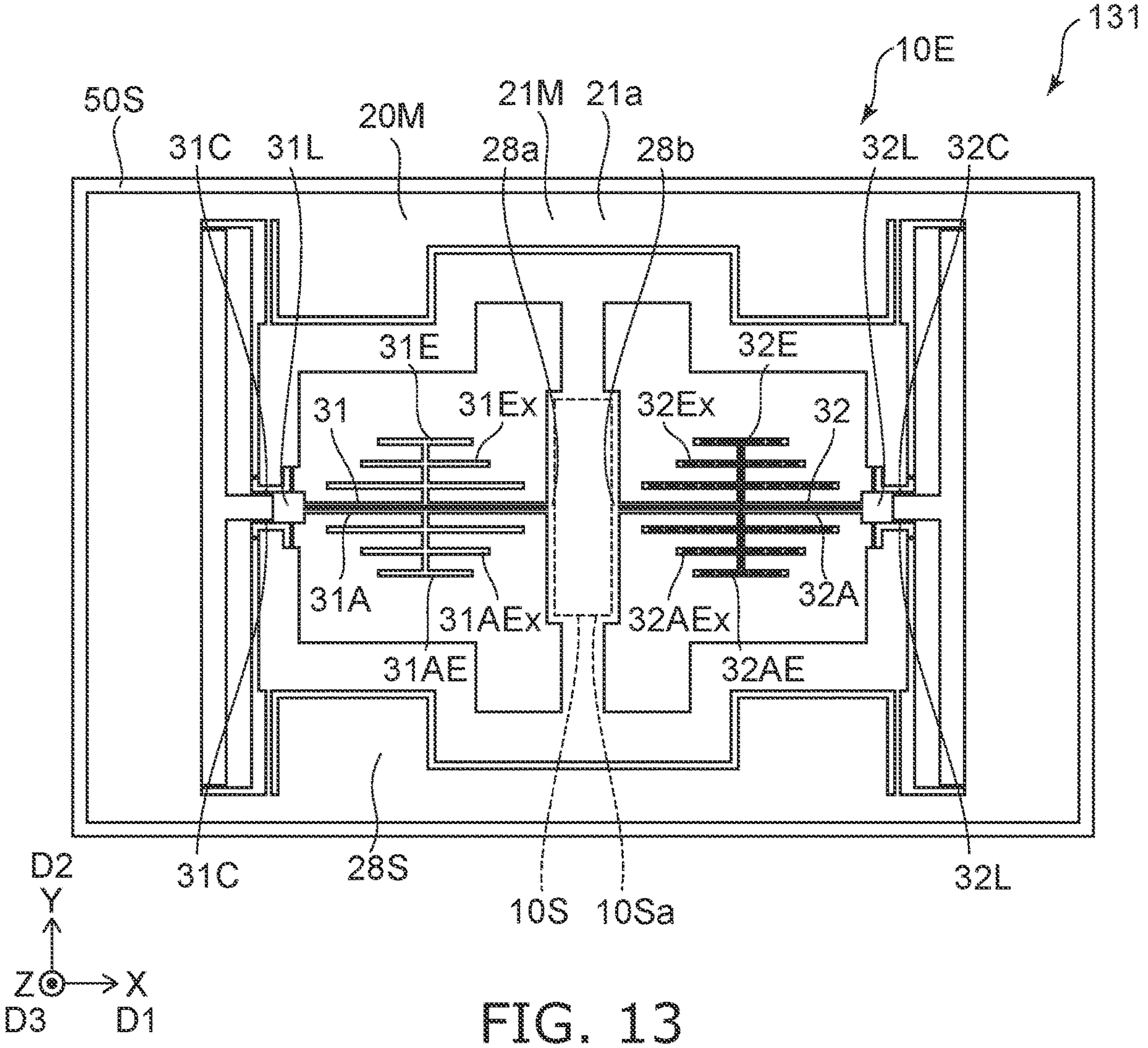
FIG. 13 is a schematic plan view illustrating a sensor according to the first embodiment.

FIG. 13 is a schematic plan view illustrating a sensor according to the first embodiment.

As shown in FIG. 13, in a sensor 131 according to the embodiment, the plurality of first extending portions 31Ex, the plurality of first opposing extending portions 31AEx, the plurality of second extending portions 32Ex, and the plurality of second opposing extending portion 32AEx are provided. Except for this, the configuration of the sensor 131 may be the same as the configuration of the sensor 130.

The plurality of first extending portions 31Ex, the plurality of first opposing extending portions 31AEx, the plurality of second extending portions 32Ex, and the plurality of second opposing extending portions 32AEx may have, for example, the configuration described with respect to the sensor 111.

Figure 14:
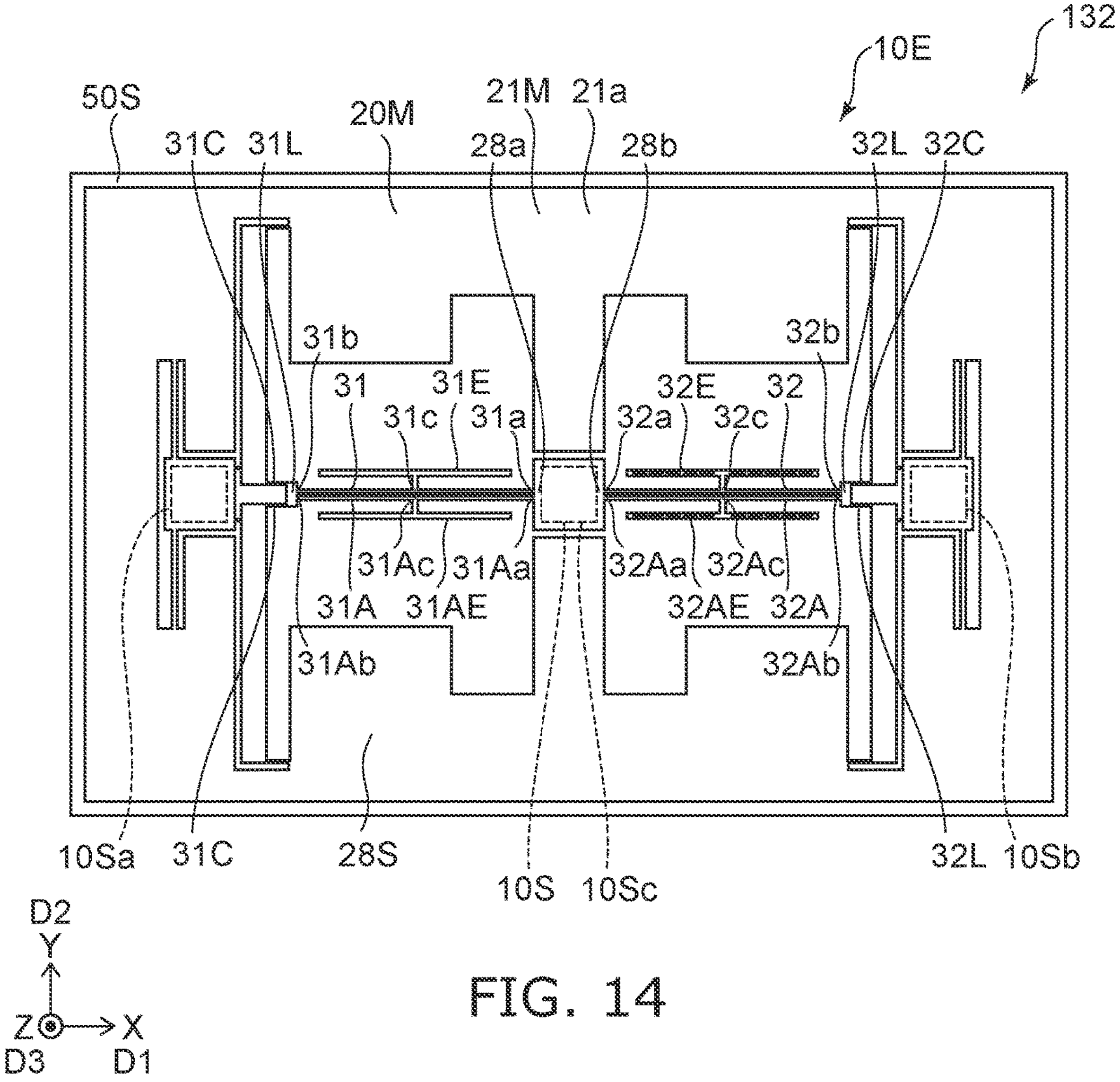
FIG. 14 is a schematic plan view illustrating a sensor according to the first embodiment.

FIG. 14 is a schematic plan view illustrating a sensor according to the first embodiment.

As shown in FIG. 14, in a sensor 132 according to the embodiment, the first fixed portion 10S includes the first fixed region 10Sa, the second fixed region 10Sb, and the third fixed region 10Sc. Except for this, the configuration of the sensor 132 may be the same as the configuration of the sensor 130. In the sensor 132, the first support region 28*a* is supported by the first fixed region 10Sa. The second support region 28*b* is supported by the second fixed region 10Sb. The third support region 28*c* is supported by the third fixed region 10Sc.

Figure 15:
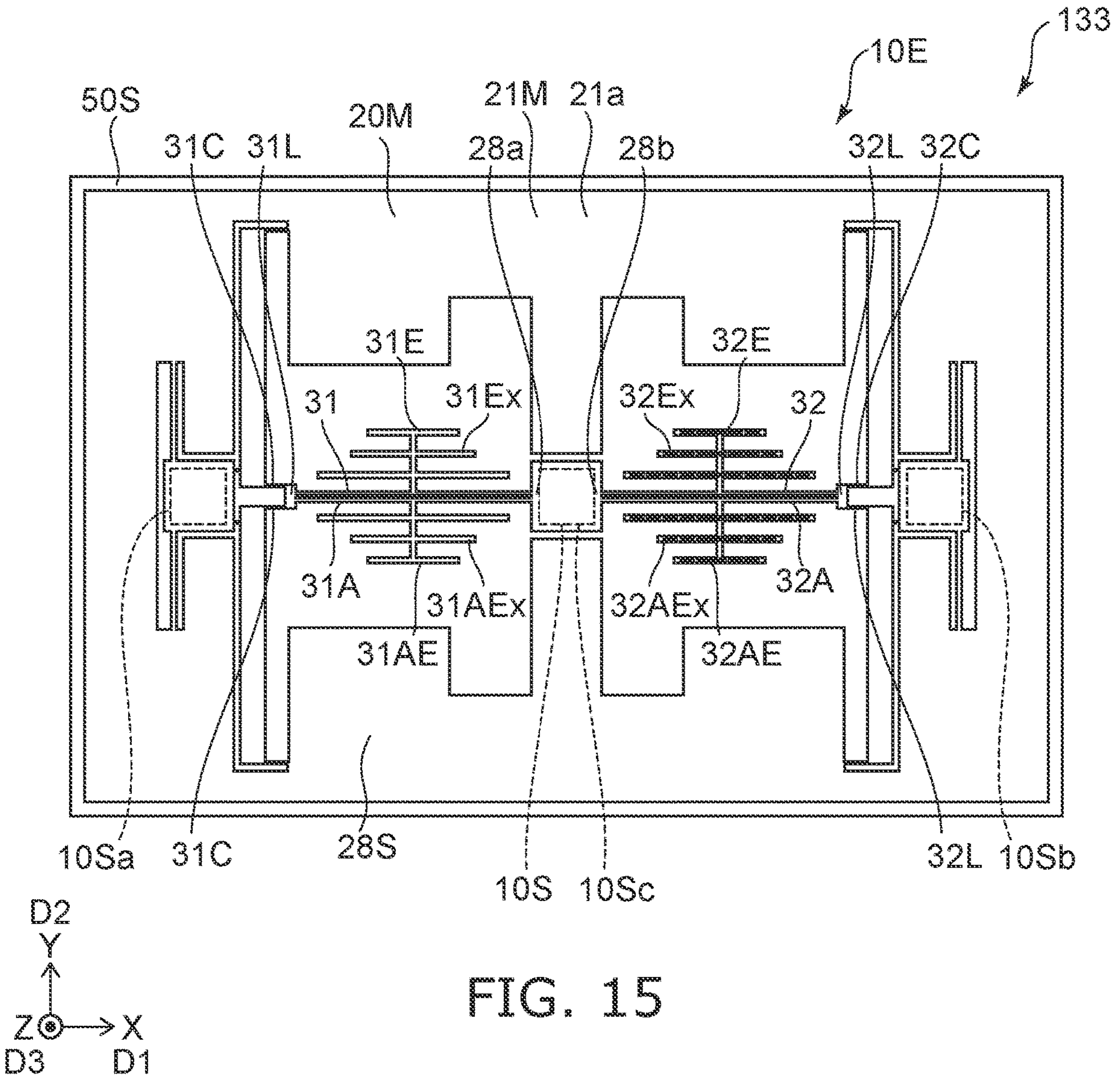
FIG. 15 is a schematic plan view illustrating a sensor according to the first embodiment.

FIG. 15 is a schematic plan view illustrating a sensor according to the first embodiment.

As shown in FIG. 15, in a sensor 133 according to the embodiment, the first fixed portion 10S includes the first fixed region 10Sa, the second fixed region 10Sb, and the third fixed region 10Sc. Except for this, the configuration of the sensor 133 may be the same as the configuration of the sensor 131.

Second Embodiment

The second embodiment relates to an electronic device.

Figure 16:
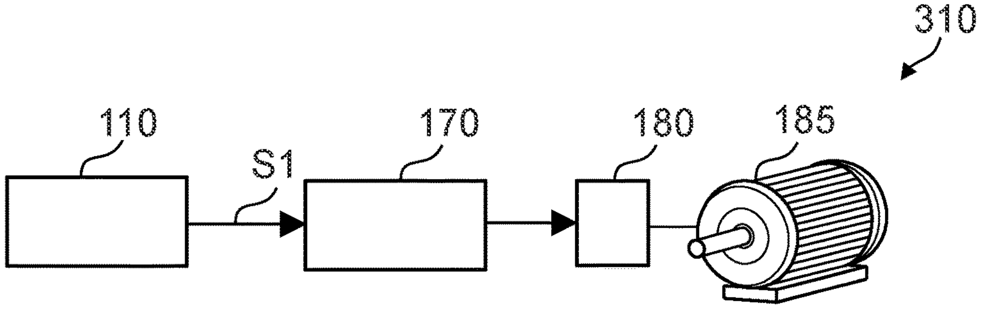
FIG. 16 is a schematic diagram illustrating an electronic device according to a second embodiment.

FIG. 16 is a schematic diagram illustrating an electronic device according to the second embodiment.

As shown in FIG. 12, an electronic device 310 according to the embodiment includes the sensor according to the first embodiment and a circuit controller 170. In the example of FIG. 12, the sensor 110 is drawn as the sensor. The circuit controller 170 is configured to control a circuit 180 based on a signal S1 obtained from the sensor. The circuit 180 is, for example, a control circuit of a driving device 185 or the like.

According to the embodiment, for example, the circuit 180 for controlling the driving device 185 can be controlled with high accuracy.

FIGS. 17A to 17H are schematic diagrams illustrating applications of the electronic device according to the embodiment.

Figure 17A:
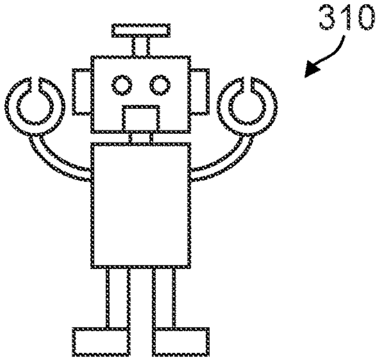
FIGS. 17A to 17H are schematic diagrams illustrating applications of the electronic device according to the embodiment.
Figure 17B:
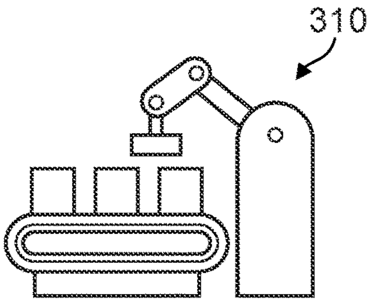
Figure 17C:
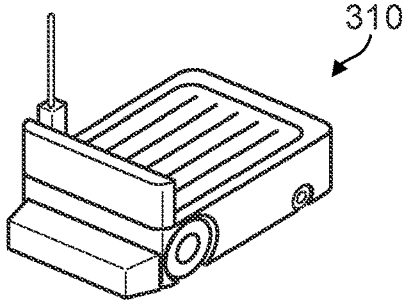
Figure 17D:
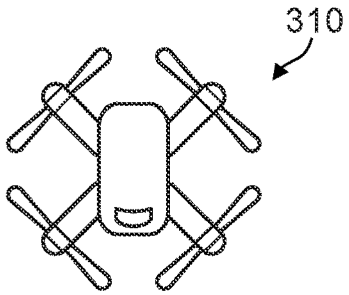
Figure 17E:
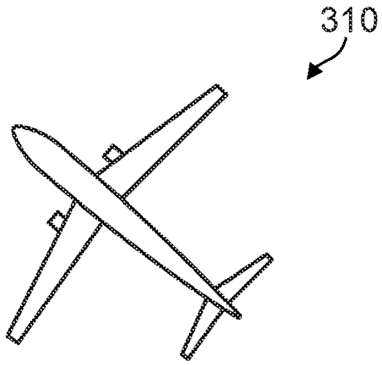
Figure 17F:
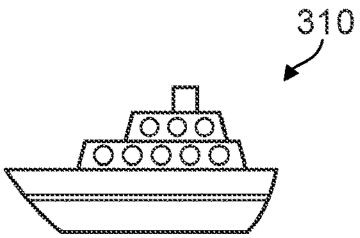
Figure 17G:
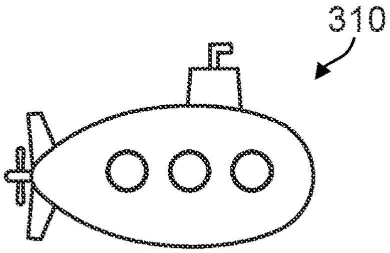
Figure 17H:
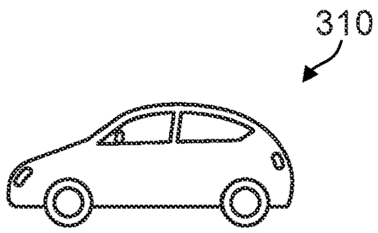

As shown in FIG. 17A, the electronic device 310 may be at least a part of a robot. As shown in FIG. 17B, the electronic device 310 may be at least a part of a work robot provided in a manufacturing factory or the like. As shown in FIG. 17C, the electronic device 310 may be at least a part of an automated guided vehicle such as in a factory. As shown in FIG. 17D, the electronic device 310 may be at least a part of a drone (unmanned aerial vehicle). As shown in FIG. 17E, the electronic device 310 may be at least a part of an airplane. As shown in FIG. 17F, the electronic device 310 may be at least a part of a vessel. As shown in FIG. 17G, the electronic device 310 may be at least a part of a submarine. As shown in FIG. 17H, the electronic device 310 may be at least a part of an automobile. The electronic device 310 may include, for example, at least one of a robot or a mobile object.

Figure 18A:
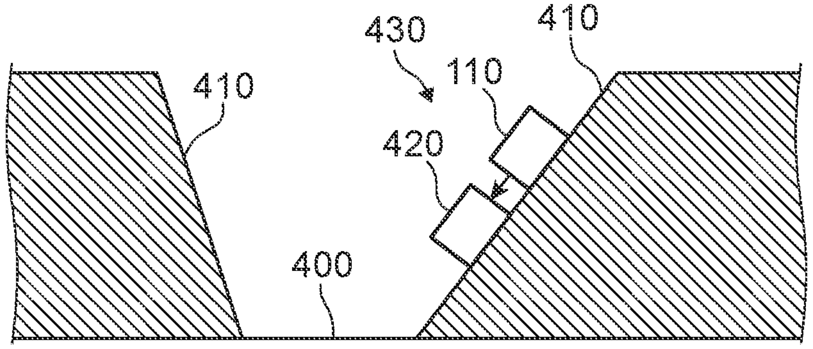
FIGS. 18A and 18B are schematic diagrams illustrating applications of the sensor according to the embodiment.
Figure 18B:
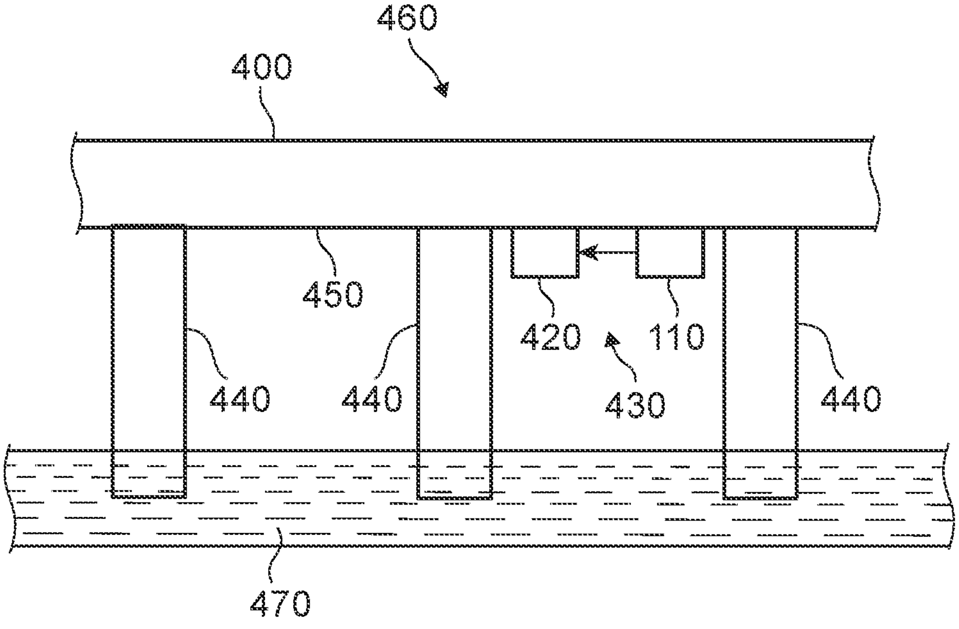

FIGS. 18A and 18B are schematic diagrams illustrating applications of the sensor according to the embodiment.

As shown in FIG. 18A, a sensor 430 according to the embodiment includes the sensor according to the first embodiment and a transmitter/receiver 420. In the example of FIG. 18A, the sensor 110 is drawn as the sensor. The transmitter/receiver 420 is configured to transmit the signal obtained from the sensor 110 by at least one of wireless or wired methods, for example. The sensor 430 is provided, for example, on a slope surface 410 such as a road 400. The sensor 430 may, for example, monitor conditions such as facilities (e.g., infrastructure). The sensor 430 may be, for example, a condition monitoring device.

For example, the sensor 430 detects changes in the state of the slope surface 410 of the road 400 with high accuracy. A change in the state of the slope surface 410 includes, for example, at least one of a change in tilt angle or a change in vibration state. The signal (test result) obtained from the sensor 110 is transmitted by the transmitter/receiver 420. The condition of facilities (e.g., infrastructure) can be monitored, e.g., continuously.

As shown in FIG. 18B, the sensor 430 is provided on a part of a bridge 460, for example. The bridge 460 is provided over a river 470. For example, the bridge 460 includes at least one of main girder 450 and a bridge pier 440. The sensor 430 is provided on at least one of the main girder 450 and the bridge pier 440. For example, the angle of at least one of the main girder 450 and the bridge pier 440 may change due to deterioration or the like. For example, in at least one of the main girder 450 and the bridge pier 440, the vibration state may change. The sensor 430 detects these changes with high accuracy. A detection result can be transmitted to an arbitrary place by the transmitter/receiver 420. Anomalies can be effectively detected.

The embodiments include the following configurations (for example, technical proposals).

Configuration 1

A sensor, comprising:

an element section including:

a first beam including a first portion and a first other portion, a direction from the first portion to the first other portion being along a first direction;

a first opposing beam, a second direction from the first opposing beam to the first beam crossing the first direction, the first opposing beam including a first opposing portion and a first other opposing portion, a direction from the first opposing portion to the first other opposing portion being along the first direction;

a support portion including a first support region connected to the first portion and the first opposing portion;

a first linking portion connected to the first other portion and the first other opposing portion; and a first connecting portion connected to the first linking portion, the first linking portion being provided between the first beam and the first connecting portion and between the first opposing beam and the first connecting portion, a first connecting portion width along the second direction of the first connecting portion being narrower than a first linking portion width along the second direction of the first linking portion.

Configuration 2

The sensor according to Configuration 1, further comprising:

a base; and a first fixed portion fixed to the base, a third direction from the base to the first fixed portion crossing a plane including the first direction and the second direction, the first support region being supported by the first fixed portion, a first gap being provided between the base and the element section, the element section including a movable member supported by the support portion, the movable member including a first movable portion, and the first connecting portion being connected to the first movable portion.

Configuration 3

The sensor according to Configuration 2, wherein the movable member includes a first movable base portion supported by the support portion, and a first movable connecting portion provided between the first movable base portion and the first movable portion, the first movable connecting portion connecting the first movable portion to the first movable base portion, and a width of the first movable connecting portion in the crossing direction crossing a direction from the first movable base to the first movable connecting portion is narrower than a width of the first movable base portion in the crossing direction, and narrower than a width of the first movable portion in the crossing direction.

Configuration 4

The sensor according to Configuration 2, wherein the first beam further includes a first intermediate portion provided between the first portion and the first other portion, the first opposing beam further includes a first opposing intermediate portion provided between the first opposing portion and the first other opposing portion,
the element section includes
a first beam electrode connected to the first intermediate portion, and
a first opposing beam electrode connected to the first opposing intermediate portion,
the first beam is provided between the first opposing beam electrode and the first beam electrode, and
the first opposing beam is provided between the first opposing beam electrode and the first beam.

Configuration 5

The sensor according to Configuration 4, wherein
the first beam electrode includes
a first extending portion extending along the first direction, and
a first extending connecting portion connecting the first extending portion to the first intermediate portion, the first extending connecting portion extending along the second direction, and
the first opposing beam electrode include
a first opposing extending portion extending along the first direction, and
a first opposing extending connecting portion connecting the first opposing extending portion to the first opposing intermediate portion, first opposing extending connecting portion extending along the second direction.

Configuration 6

The sensor according to Configuration 5, wherein
the first beam electrode includes a plurality of the first extending portions,
the first opposing beam electrode includes a plurality of the first opposing extending portions,
one of the plurality of first extending portions is provided between the first beam and another one of the plurality of first extending portions,
a length of the one of the plurality of first extending portions along the first direction is longer than a length of the other one of the plurality of first extending portions along the first direction,
one of the plurality of first opposing extending portions is provided between the first opposing beam and another one of the plurality of first opposing extending portions, and
a length of the one of the plurality of first opposing extending portions along the first direction is longer than a length of the other one of the plurality of first opposing extending portions along the first direction.

Configuration 7

The sensor according to Configuration 4, wherein
the element section includes a second beam, a second opposing beam, a second linking portion, and a second connecting portion,
the support portion further includes a second support region,
the second beam includes a second portion and a second other portion, a direction from the second portion to the second other portion being along the first direction,
the second opposing beam includes a second opposing portion and a second other opposing portion, a direction from the second opposing portion to the second other opposing portion being along the first direction,
the second support region is connected to the second portion and the second opposing portion,
the second linking portion is connected to the second other portion and the second other opposing portion,
the second connecting portion is connected to the second linking portion,
the second linking portion is provided between the second beam and the second connecting portion and between the second opposing beam and the second connecting portion, and
a second connecting portion width along the second direction of the second connecting portion is narrower than a second linking portion width along the second direction of the second linking portion.

Configuration 8

The sensor according to Configuration 7, wherein
a direction from the second beam to the first beam is along the second direction.

Configuration 9

The sensor according to Configuration 7, wherein
a direction from the second beam to the first beam is along the first direction.

Configuration 10

The sensor according to Configuration 7, wherein
the first linking portion is provided between the first support region and the second support region in the first direction, and
the second linking portion is provided between the first linking portion and the second support region in the first direction.

Configuration 11

The sensor according to Configuration 7, wherein
the first support region is provided between the first linking portion and the second linking portion in the first direction, and
the second support region is provided between the first support region and the second linking portion in the first direction.

Configuration 12

The sensor according to Configuration 7, wherein
the second beam further includes a second intermediate portion provided between the second portion and the second other portion,
the second opposing beam further includes a second opposing intermediate portion provided between the second opposing portion and the second other opposing portion,
the element section includes
a second beam electrode connected to the second intermediate portion, and
a second opposing beam electrode connected to the second opposing intermediate portion, the second beam is provided between the second opposing beam electrode and the second beam electrode, and the second opposing beam is provided between the second opposing beam electrode and the second beam.

Configuration 13

The sensor according to Configuration 12, wherein the second beam electrode includes a second extending portion extending along the first direction, and a second extending connecting portion connecting the second extending portion to the second intermediate portion, the second extending connecting portion extending along the second direction, the second opposing beam electrode includes a second opposing extending portion extending along the first direction, and a second opposing extending connecting portion connecting the second opposing extending portion to the second opposing intermediate portion, the second opposing extending connecting portion extending along the second direction.

Configuration 14

The sensor according to Configuration 13, wherein the second beam electrode includes a plurality of the second extending portions, the second opposing beam electrode includes a plurality of the second opposing extending portions, one of the plurality of second extending portions is provided between the second beam and another one of the plurality of second extending portions, a length of the one of the plurality of second extending portions along the first direction is longer than a length of the other one of the plurality of second extending portions along the first direction, one of the plurality of second opposing extending portions is provided between the second opposing beam and another one of the plurality of second opposing extending portions, and a length of the one of the plurality of second opposing extending portions along the first direction is longer than a length of the other one of the plurality of second opposing extending portions along the first direction.

Configuration 15

The sensor according to any one of Configurations 12-14, wherein the first beam electrode and the second beam electrode satisfy at least one of the first condition, the second condition, the third condition, the fourth condition, the fifth condition, the sixth condition, the seventh condition or the eighth condition, in the first condition, a second mass of the second beam electrode is different from a first mass of the first beam electrode, in the second condition, a second thickness of the second beam electrode along the third direction is different from a first thickness of the first beam electrode along the third direction, in the third condition, at least a part of a second material included in the second beam electrode is different from at least a part of a first material included in the first beam electrode, in the fourth condition, a second size of a second hole included in the second beam electrode is different from a first size of a first hole included in the first beam electrode, in the fifth condition, a second density of the second holes is different from a first density of the first holes, in the sixth condition, a second number of the second holes is different from a first number of the first holes, in the seventh condition, a second shape of the second hole is different from a first shape of the first hole, and in the eighth condition, a second layer structure of the second beam electrode is different from a first layer structure of the first beam electrode.

Configuration 16

The sensor according to Configuration 7, wherein the movable member includes a first movable base portion supported by the support portion, and a first movable connecting portion provided between the first movable base portion and the first movable portion, the first movable connecting portion connecting the first movable portion to the first movable base portion, a width of the first movable connecting portion in a crossing direction crossing a direction from the first movable base portion to the first movable connecting portion is narrower than a width of the first movable base portion in the crossing direction, and narrower than a width of the first movable portion in the crossing direction, and the crossing direction is along the second direction.

Configuration 17

The sensor according to Configuration 4, wherein the element section further includes a first fixed electrode and a first opposing fixed electrode fixed to the base, the first fixed electrode faces the first beam electrode, the first opposing fixed electrode faces the first opposing beam electrode, ae direction from the first fixed electrode to the first beam electrode is along the second direction, and a direction from the first opposing fixed electrode to the first opposing beam electrode is along the second direction.

Configuration 18

The sensor according to Configuration 17, further comprising:

a controller, the controller being configured to apply a first AC signal between the first fixed electrode and the first beam electrode, and the controller being configured to detect a first signal generated between the first opposing fixed electrode and the first opposing beam electrode.

Configuration 19

The sensor according to any one of Configurations 1-18, wherein the first beam includes a first beam face facing the first opposing beam, the first opposing beam includes a first opposing beam face facing the first beam, and the first beam face and the first opposing beam face extend along the first direction.

Configuration 20

An electronic device, comprising:

the sensor according to any one of Configuration 1-18; and a circuit controller configured to control a circuit based on a signal obtained from the sensor.

According to the embodiments, a sensor and an electronic devices capable of enhanced properties can be provided.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as bases, element sections, support portions, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors and electronic devices practicable by an appropriate design modification by one skilled in the art based on the sensors and the electronic devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:

an element section;

a base; and a first fixed portion fixed to the base, the element section including:

a first beam including a first portion and a first other portion, a direction from the first portion to the first other portion being along a first direction;

a first opposing beam, a second direction from the first opposing beam to the first beam crossing the first direction, the first opposing beam including a first opposing portion and a first other opposing portion, a direction from the first opposing portion to the first other opposing portion being along the first direction;

a support portion including a first support region connected to the first portion and the first opposing portion;

a first linking portion connected to the first other portion and the first other opposing portion; and a first connecting portion connected to the first linking portion, the first linking portion being provided between the first beam and the first connecting portion and between the first opposing beam and the first connecting portion, a first connecting portion width along the second direction of the first connecting portion being narrower than a first linking portion width along the second direction of the first linking portion, a third direction from the base to the first fixed portion crossing a plane including the first direction and the second direction, the first support region being supported by the first fixed portion, a first gap being provided between the base and the element section, wherein the support portion further includes a second support region, and a third support region, the element section includes a movable member supported by the third support region, the movable member including a first movable base portion, a first movable connecting portion, a first movable portion, and a first movable intermediate portion, the first movable connecting portion is between the first movable base portion and the first movable intermediate portion in the second direction, the first movable portion is between the first movable connecting portion and the first movable intermediate portion in the second direction, the first connecting portion is connected to the first movable portion, the first beam further includes a first intermediate portion provided between the first portion and the first other portion, the first opposing beam further includes a first opposing intermediate portion provided between the first opposing portion and the first other opposing portion, the element section includes a first beam electrode connected to the first intermediate portion, and a first opposing beam electrode connected to the first opposing intermediate portion, the first beam is provided between the first opposing beam electrode and the first beam electrode, and the first opposing beam is provided between the first opposing beam electrode and the first beam, the element section includes a second beam, a second opposing beam, a second linking portion, and a second connecting portion, the first movable portion is between the first connecting portion and the second connecting portion in the first direction, the first linking portion is between the first support region and the first movable portion in the first direction, the second linking portion is between the first movable portion and the second support region in the first direction, the second beam includes a second portion and a second other portion, a direction from the second portion to the second other portion is along the first direction, a direction from the first beam to the second beam is along the first direction, the second opposing beam includes a second opposing portion and a second other opposing portion, a direction from the second opposing portion to the second other opposing portion is along the first direction, a direction from the first opposing beam to the second opposing beam is along the first direction, the second support region is connected to the second portion and the second opposing portion, the second linking portion is connected to the second other portion and the second other opposing portion, the second connecting portion is connected to the first movable portion, the second connecting portion is connected to the second linking portion, the second linking portion is provided between the second beam and the second connecting portion and between the second opposing beam and the second connecting portion, and a second connecting portion width along the second direction of the second connecting portion is narrower than a second linking portion width along the second direction of the second linking portion.

2. The sensor according to claim 1, wherein a width of the first movable connecting portion in a crossing direction crossing a direction from the first movable base portion to the first movable connecting portion is narrower than a width of the first movable base portion in the crossing direction, and narrower than a width of the first movable portion in the crossing direction.

3. The sensor according to claim 1, wherein the first beam electrode includes a first extending portion extending along the first direction, and a first extending connecting portion connecting the first extending portion to the first intermediate portion, the first extending connecting portion extending along the second direction, and the first opposing beam electrode include a first opposing extending portion extending along the first direction, and a first opposing extending connecting portion connecting the first opposing extending portion to the first opposing intermediate portion, first opposing extending connecting portion extending along the second direction.

4. The sensor according to claim 3, wherein the first beam electrode includes a plurality of the first extending portions, the first opposing beam electrode includes a plurality of the first opposing extending portions, one of the plurality of first extending portions is provided between the first beam and another one of the plurality of first extending portions, a length of the one of the plurality of first extending portions along the first direction is longer than a length of the other one of the plurality of first extending portions along the first direction, one of the plurality of first opposing extending portions is provided between the first opposing beam and another one of the plurality of first opposing extending portions, and a length of the one of the plurality of first opposing extending portions along the first direction is longer than a length of the other one of the plurality of first opposing extending portions along the first direction.

5. The sensor according to claim 1, wherein the first linking portion is provided between the first support region and the second support region in the first direction, and the second linking portion is provided between the first linking portion and the second support region in the first direction.

6. The sensor according to claim 1, wherein the first support region is provided between the first linking portion and the second linking portion in the first direction, and the second support region is provided between the first support region and the second linking portion in the first direction.

7. The sensor according to claim 1, wherein the second beam further includes a second intermediate portion provided between the second portion and the second other portion, the second opposing beam further includes a second opposing intermediate portion provided between the second opposing portion and the second other opposing portion, the element section includes a second beam electrode connected to the second intermediate portion, and a second opposing beam electrode connected to the second opposing intermediate portion, the second beam is provided between the second opposing beam electrode and the second beam electrode, and the second opposing beam is provided between the second opposing beam electrode and the second beam.

8. The sensor according to claim 7, wherein the second beam electrode includes a second extending portion extending along the first direction, and a second extending connecting portion connecting the second extending portion to the second intermediate portion, the second extending connecting portion extending along the second direction, the second opposing beam electrode includes a second opposing extending portion extending along the first direction, and a second opposing extending connecting portion connecting the second opposing extending portion to the second opposing intermediate portion, the second opposing extending connecting portion extending along the second direction.

9. The sensor according to claim 8, wherein the second beam electrode includes a plurality of the second extending portions, the second opposing beam electrode includes a plurality of the second opposing extending portions, one of the plurality of second extending portions is provided between the second beam and another one of the plurality of second extending portions, a length of the one of the plurality of second extending portions along the first direction is longer than a length of the other one of the plurality of second extending portions along the first direction, one of the plurality of second opposing extending portions is provided between the second opposing beam and another one of the plurality of second opposing extending portions, and a length of the one of the plurality of second opposing extending portions along the first direction is longer than a length of the other one of the plurality of second opposing extending portions along the first direction.

10. The sensor according to claim 7, wherein the first beam electrode and the second beam electrode satisfy at least one of a first condition, a second condition, a third condition, a fourth condition, a fifth condition, a sixth condition, a seventh condition or a eighth condition, in the first condition, a second mass of the second beam electrode is different from a first mass of the first beam electrode, in the second condition, a second thickness of the second beam electrode along the third direction is different from a first thickness of the first beam electrode along the third direction, in the third condition, at least a part of a second material included in the second beam electrode is different from at least a part of a first material included in the first beam electrode, in the fourth condition, a second size of a second hole included in the second beam electrode is different from a first size of a first hole included in the first beam electrode, in the fifth condition, a second density of the second holes is different from a first density of the first holes, in the sixth condition, a second number of the second holes is different from a first number of the first holes, in the seventh condition, a second shape of the second hole is different from a first shape of the first hole, and in the eighth condition, a second layer structure of the second beam electrode is different from a first layer structure of the first beam electrode.

11. The sensor according to claim 1, wherein the element section further includes a first fixed electrode and a first opposing fixed electrode fixed to the base, the first fixed electrode faces the first beam electrode, the first opposing fixed electrode faces the first opposing beam electrode, a direction from the first fixed electrode to the first beam electrode is along the second direction, and a direction from the first opposing fixed electrode to the first opposing beam electrode is along the second direction.

12. The sensor according to claim 11, further comprising:

a controller, the controller being configured to apply a first AC signal between the first fixed electrode and the first beam electrode, and the controller being configured to detect a first signal generated between the first opposing fixed electrode and the first opposing beam electrode.

13. The sensor according to claim 1, wherein the first beam includes a first beam face facing the first opposing beam, the first opposing beam includes a first opposing beam face facing the first beam, and the first beam face and the first opposing beam face extend along the first direction.

14. An electronic device, comprising:

the sensor according to claim 1; and a circuit controller configured to control a circuit based on a signal obtained from the sensor.

* * * * *